US007047372B2

(12) United States Patent
Zeitler et al.

(10) Patent No.: US 7,047,372 B2
(45) Date of Patent: May 16, 2006

(54) MANAGING I/O ACCESSES IN MULTIPROCESSOR SYSTEMS

(75) Inventors: Carl Zeitler, Tomball, TX (US); David B. Glasco, Austin, TX (US); Rajesh Kota, Austin, TX (US); Guru Prasadh, Austin, TX (US); Richard R. Oehler, Somers, NY (US); David S. Edrich, Austin, TX (US)

(73) Assignee: Newisys, Inc., Austin, TX (US)

( * ) Notice: Subject to any disclaimer, the term of this patent is extended or adjusted under 35 U.S.C. 154(b) by 250 days.

(21) Appl. No.: 10/414,834

(22) Filed: Apr. 15, 2003

(65) Prior Publication Data

US 2004/0210693 A1     Oct. 21, 2004

(51) Int. Cl.
*G06F 12/00* (2006.01)
*G06F 13/24* (2006.01)
*G06F 17/50* (2006.01)

(52) U.S. Cl. .......................... 711/154; 710/260; 716/1

(58) Field of Classification Search ................ 711/141, 711/147–148, 153–154; 709/213, 231, 232; 710/260
See application file for complete search history.

(56) References Cited

U.S. PATENT DOCUMENTS

| | | | | |
|---|---|---|---|---|
| 5,864,738 | A * | 1/1999 | Kessler et al. ............... | 709/239 |
| 6,088,769 | A * | 7/2000 | Luick et al. ................. | 711/141 |
| 6,167,492 | A | 12/2000 | Keller et al. ................. | 711/154 |
| 6,173,374 | B1 * | 1/2001 | Heil et al. .................... | 711/148 |
| 6,247,161 | B1 * | 6/2001 | Lambrecht et al. ........... | 716/1 |
| 6,295,573 | B1 * | 9/2001 | Bailey et al. ................. | 710/260 |
| 6,385,705 | B1 | 5/2002 | Keller et al. ................. | 711/154 |
| 6,490,661 | B1 | 12/2002 | Keller et al. ................. | 711/150 |
| 6,760,786 | B1 * | 7/2004 | Hagersten ..................... | 710/5 |
| 6,826,660 | B1 * | 11/2004 | Hagersten et al. ........... | 711/153 |

OTHER PUBLICATIONS

*HyperTransport ™ I/O Link Specification Revision 1.03*. HyperTransport ™ Consortium, Oct. 10, 2001, Copyright © 2001 HyperTransport Technology Consortium.

* cited by examiner

*Primary Examiner*—Nasser Moazzami
(74) *Attorney, Agent, or Firm*—Beyer Weaver & Thomas, LLP

(57) ABSTRACT

A computer system is described having a plurality of processing nodes interconnected by a first point-to-point architecture, and a system memory including a plurality of portions each of which is associated with one of the processing nodes. Each processing node includes a processor, and a memory controller for controlling access to the associated portion of the system memory, and may contain a host bridge for facilitating communication with a plurality of I/O devices. The first point-to-point architecture is operable to facilitate first transactions between the processors and the system memory. The computer system further includes at least one I/O controller and a second point-to-point architecture independent of the first point-to-point architecture and interconnecting the I/O controller and the host bridges. The at least one I/O controller is operable to facilitate second transactions between the I/O devices and the system memory via the second point-to-point architecture.

20 Claims, 19 Drawing Sheets

| | | Local Table | | Global Table | | | |
|---|---|---|---|---|---|---|---|
| | | Dest Node | | Dest Cluster | | | |
| Source | | $N_0$ | $N_1$ | $C_0$ | $C_1$ | $C_2$ | $C_3$ |
| Cluster 0 | Node 0 | X | $L_0$ | NA | NA | NA | NA |
| | Node 1 | $L_0$ | X | X | $L_1$ | $L_2$ | $L_1$ |
| Cluster 1 | Node 0 | X | $L_0$ | NA | NA | NA | NA |
| | Node 1 | $L_0$ | X | $L_1$ | X | $L_2$ | $L_2$ |
| Cluster 2 | Node 0 | X | $L_0$ | NA | NA | NA | NA |
| | Node 1 | $L_0$ | X | $L_2$ | $L_2$ | X | $L_1$ |
| Cluster 3 | Node 0 | X | $L_0$ | NA | NA | NA | NA |
| | Node 1 | $L_0$ | X | $L_2$ | $L_2$ | $L_1$ | X |

MANAGING I/O ACCESSES IN MULTIPROCESSOR SYSTEMS

BACKGROUND OF THE INVENTION

The present invention relates generally to multi-processor computer systems. More specifically, the present invention provides techniques for building computer systems having a plurality of multi-processor clusters.

A relatively new approach to the design of multi-processor systems replaces broadcast communication among processors with a point-to-point data transfer mechanism in which the processors communicate similarly to network nodes in a tightly-coupled computing system. That is, the processors are interconnected via a plurality of communication links and requests are transferred among the processors over the links according to routing tables associated with each processor. The intent is to increase the amount of information transmitted within a multi-processor platform per unit time.

One limitation associated with such an architecture is that the processing throughput for transactions in a computer system employing such a point-to-point data transfer mechanism is limited by the capacity of the protocol engine(s) responsible for processing those transactions, and bottlenecks between I/O devices and the point-to-point infrastructure, as well as the bandwidth of the point-to-point infrastructure itself.

It is therefore desirable to provide techniques by which computer systems employing such an infrastructure as a basic building block are not so limited.

SUMMARY OF THE INVENTION

According to the present invention, a computer system is provided having a plurality of processing nodes interconnected by a first point-to-point architecture, and a system memory including a plurality of portions each of which is associated with one of the processing nodes. Each processing node includes a processor, a memory controller for controlling access to the associated portion of the system memory, and a host bridge for facilitating communication with a plurality of I/O devices. The first point-to-point architecture is operable to facilitate first transactions between the processors and the system memory. The computer system further includes at least one I/O controller and a second point-to-point architecture independent of the first point-to-point architecture and interconnecting the I/O controller and the host bridges. The at least one I/O controller is operable to facilitate second transactions between the I/O devices and the system memory via the second point-to-point architecture.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order not to unnecessarily obscure the present invention.

Figure 1A:
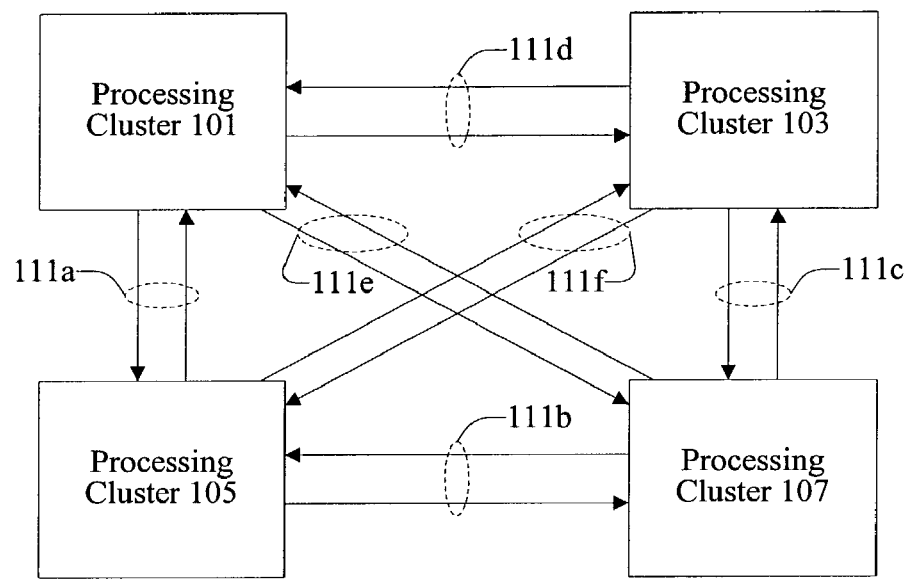
FIGS. 1A and 1B are diagrammatic representations depicting systems having multiple clusters.

FIG. 1A is a diagrammatic representation of one example of a multiple cluster, multiple processor system which may employ the techniques of the present invention. Each processing cluster 101, 103, 105, and 107 includes a plurality of processors. The processing clusters 101, 103, 105, and 107 are connected to each other through point-to-point links 111a–f. The multiple processors in the multiple cluster architecture shown in FIG. 1A share a global memory space. In this example, the point-to-point links 111a–f are internal system connections that are used in place of a traditional front-side bus to connect the multiple processors in the multiple clusters 101, 103, 105, and 107. The point-to-point links may support any point-to-point coherence protocol.

Figure 1B:
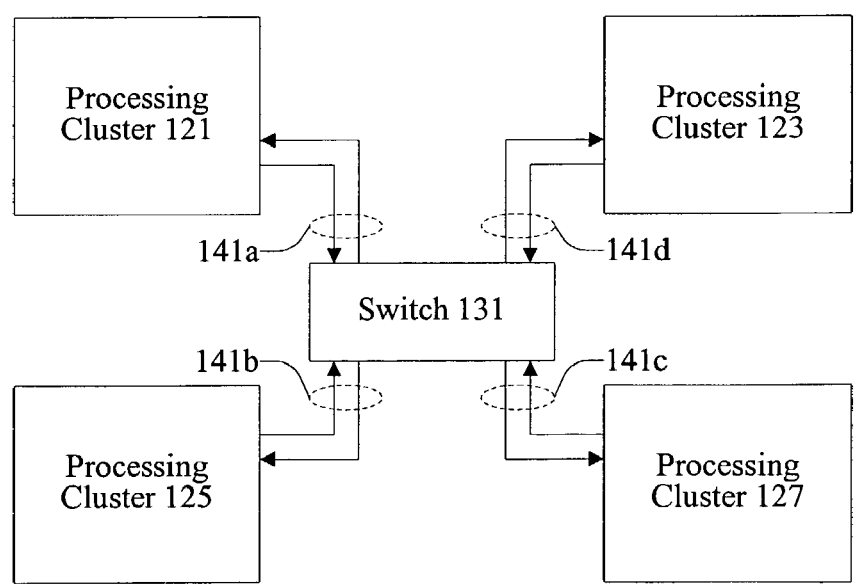

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a–d. It should be noted that using a switch and point-to-point links allows implementation with fewer point-to-point links when connecting multiple clusters in the system. A switch 131 can include a general purpose processor with a coherence protocol interface. According to various implementations, a multi-cluster system shown in FIG. 1A may be expanded using a switch 131 as shown in FIG. 1B.

Figure 2:
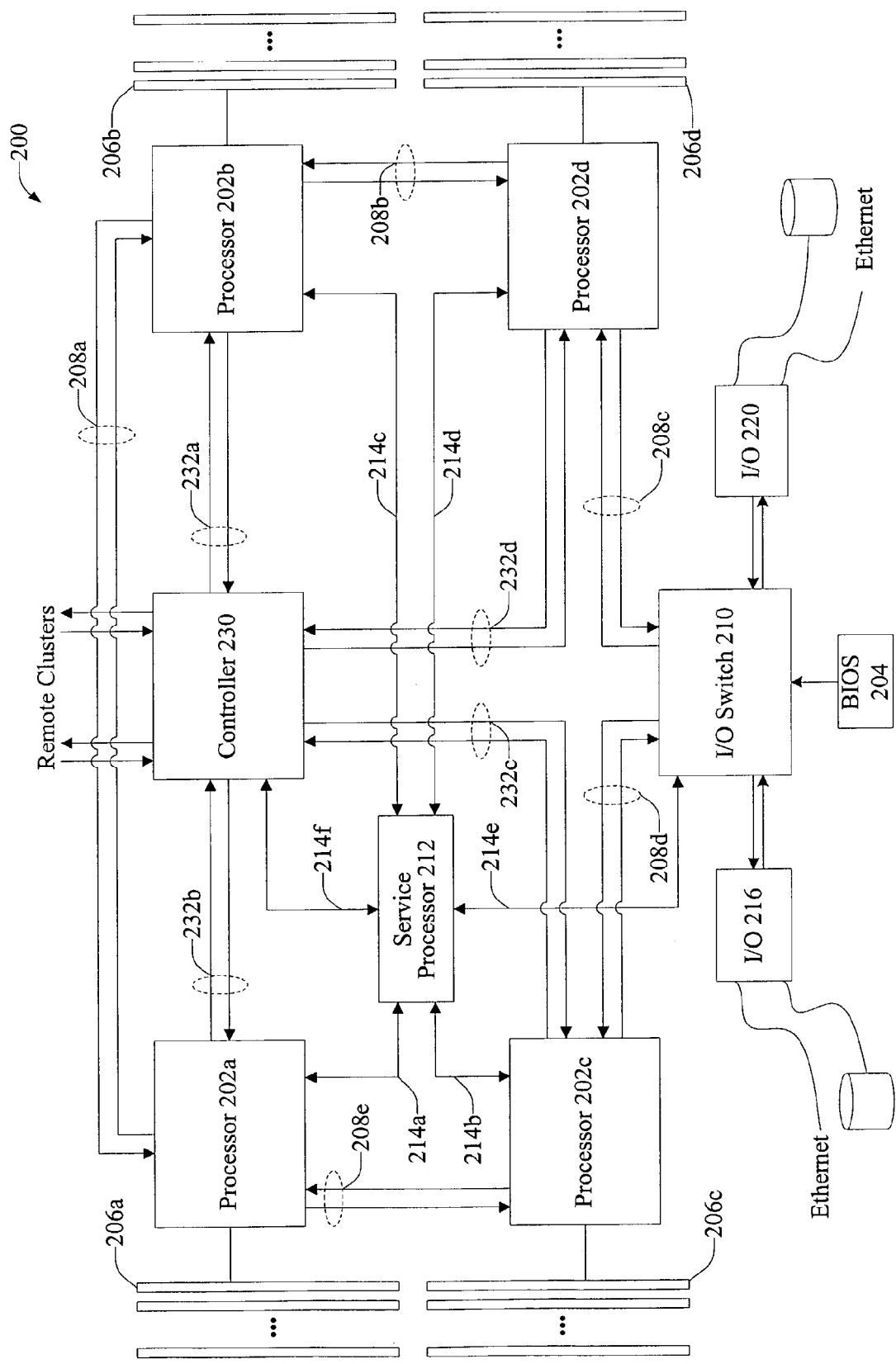
FIG. 2 is a diagrammatic representation of an exemplary cluster having a plurality of processors for use with specific embodiments of the present invention.

FIG. 2 is a diagrammatic representation of a multiple processor cluster such as, for example, cluster 101 shown in FIG. 1A. Cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and interconnection controller 230. The service processor 212 is configured to allow communications with processors 202a–202d, I/O switch 210, and interconnection controller 230 via a JTAG interface represented in FIG. 2 by links 214a–214f. It should be noted that other interfaces are supported. I/O switch 210 connects the rest of the system to I/O adapters 216 and 220, and to BIOS 204 for booting purposes.

It should be noted that the use of I/O switch 210 allows for the communication of I/O devices with only a single host bridge at a time. Such communication also requires a portion of the bandwidth of the links interconnecting processing nodes 202 and interconnecting clusters (i.e., the coherent point-to-point architecture or fabric). Thus, as will be described below, alternative mechanisms are provided by various embodiments of the present invention whereby use of the coherent fabric's bandwidth may be avoided, and by which multiple host bridges may be facilitating I/O transactions simultaneously.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables can also be changed by execution of the BIOS code in one or more processors. The routing tables are used to control and isolate various system resources, the connections between which are defined therein.

The processors 202a–d are also coupled to an interconnection controller 230 through point-to-point links 232a–d. According to various embodiments and as will be described below in greater detail, interconnection controller 230 performs a variety of functions which enable the number of interconnected processors in the system to exceed the node ID space and mapping table limitations associated with each of a plurality of processor clusters. According to some embodiments, interconnection controller 230 performs a variety of other functions including the maintaining of cache coherency across clusters. Interconnection controller 230 can be coupled to similar controllers associated with other multi-processor clusters. It should be noted that there can be more than one such interconnection controller in one cluster. Interconnection controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet. BIOS 204 may be any persistent memory like flash memory.

According to one embodiment, service processor 212 is a Motorola MPC855T microprocessor which includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, interconnection controller 230 is a specially configured programmable chip such as a programmable logic device or a field programmable gate array. In another embodiment, the interconnect controller 230 is an Application Specific Integrated Circuit (ASIC). In yet another embodiment, the interconnect controller 230 is a general purpose processor augmented with an ability to access and process interconnect packet traffic.

Figure 3:
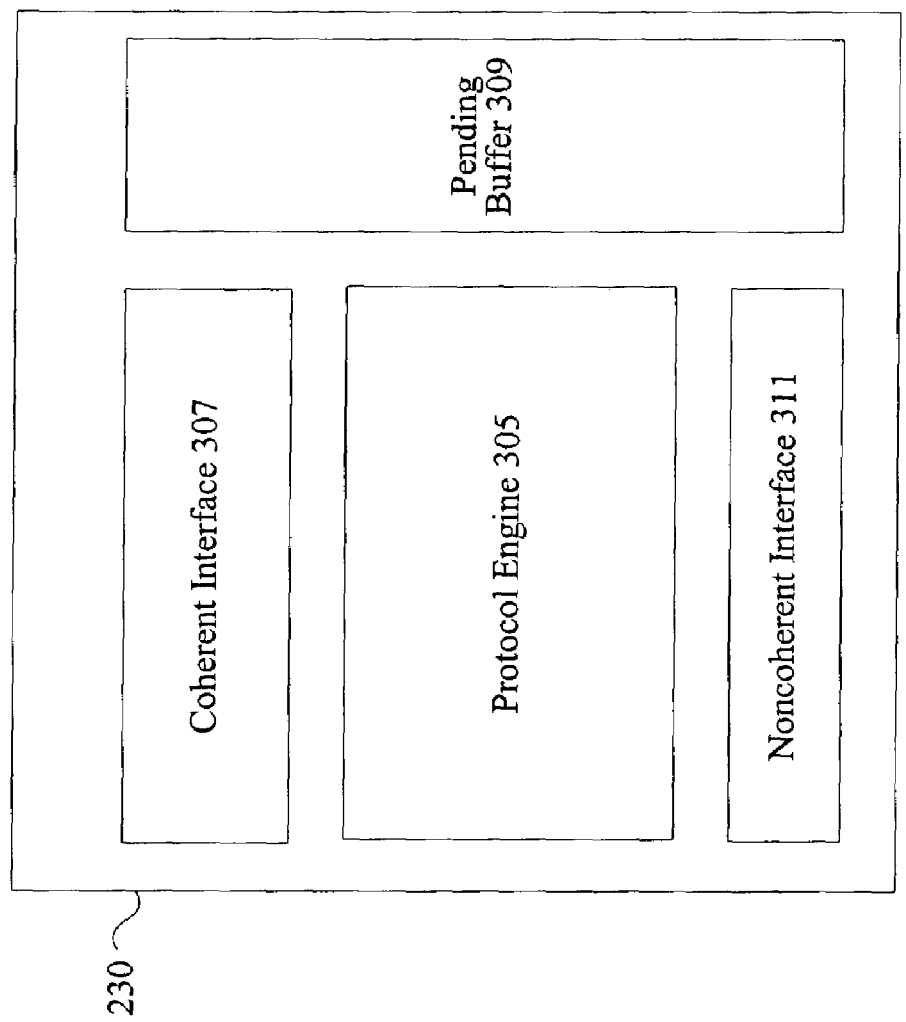
FIG. 3 is a diagrammatic representation of an exemplary interconnection controller for facilitating various embodiments of the present invention.

FIG. 3 is a diagrammatic representation of one example of an interconnection controller 230 for facilitating various aspects of the present invention. According to various embodiments, the interconnection controller includes at least one protocol engine 305 configured to handle packets such as probes and requests received from processors in various clusters of a multi-processor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the interconnection controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information. As will become clear, this functionality is leveraged to enable particular aspects of the present invention.

The interconnection controller has a coherent protocol interface 307 that allows the interconnection controller to communicate with other processors in the cluster as well as external processor clusters. The interconnection controller may also include other interfaces such as a non-coherent protocol interface 311 for communicating with I/O devices (e.g., as represented in FIG. 2 by links 208c and 208d). According to various embodiments, each interface 307 and 311 is implemented either as a full crossbar or as separate receive and transmit units using components such as multiplexers and buffers. It should be noted that to the interconnection controller 230 does not necessarily need to provide both coherent and non-coherent interfaces. It should also be noted that an interconnection controller 230 in one cluster can communicate with an interconnection controller 230 in another cluster.

Figure 4:
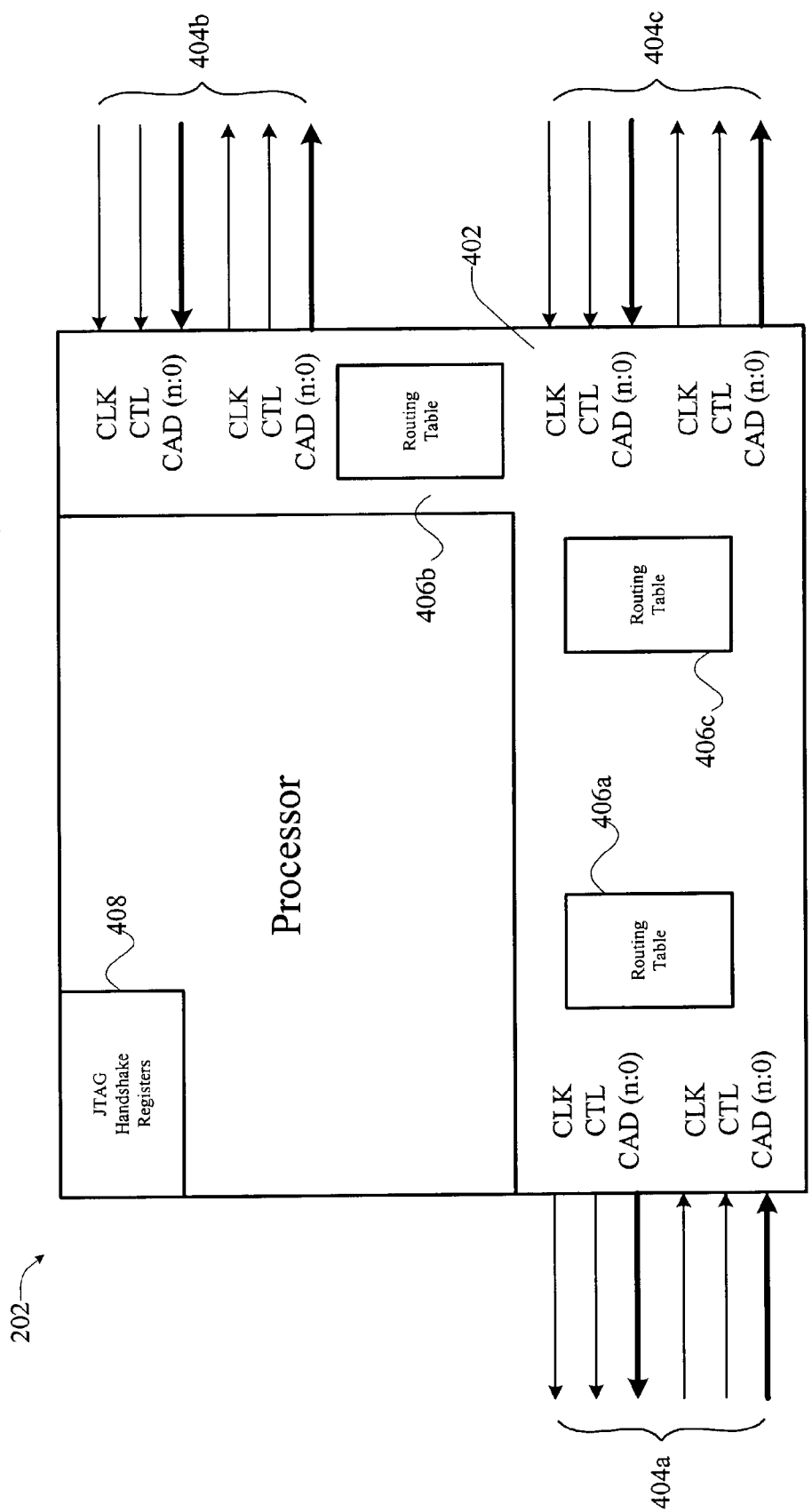
FIG. 4 is a diagrammatic representation of a local processor for use with various embodiments of the present invention.

According to various embodiments of the invention, processors 202a–202d are substantially identical. FIG. 4 is a simplified block diagram of such a processor 202 which includes an interface 402 having a plurality of ports 404a–404c and routing tables 406a–406c associated therewith. Each port 404 allows communication with other resources, e.g., processors or I/O devices, in the computer system via associated links, e.g., links 208a–208e of FIG. 2.

The infrastructure shown in FIG. 4 can be generalized as a point-to-point, distributed routing mechanism which comprises a plurality of segments interconnecting the systems processors according to any of a variety of topologies, e.g., ring, mesh, etc. Each of the endpoints of each of the segments is associated with a connected processor which has a unique node ID and a plurality of associated resources which it "owns," e.g., the memory and I/O to which it's connected.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., given a particular address within a range of addresses, go to node x; and for node x use link y.

As shown in FIG. 4, processor 202 can conduct point-to-point communication with three other processors according to the information in the associated routing tables. According to a specific embodiment, routing tables 406a–406c comprise two-level tables, a first level associating the unique addresses of system resources (e.g., a memory bank) with a corresponding node (e.g., one of the processors), and a second level associating each node with the link (e.g., 208a–208e) to be used to reach the node from the current node.

Processor 202 also has a set of JTAG handshake registers 408 which, among other things, facilitate communication between the service processor (e.g., service processor 212 of FIG. 2) and processor 202. That is, the service processor can write routing table entries to handshake registers 408 for eventual storage in routing tables 406a–406c. It should be understood that the processor architecture depicted in FIG. 4 is merely exemplary for the purpose of describing a specific embodiment of the present invention. For example, a fewer or greater number of ports and/or routing tables may be used to implement other embodiments of the invention.

As mentioned above, the basic protocol upon which the clusters in specific embodiments of the invention are based provides for a limited node ID space which, according to a particular implementation, is a 3-bit space, therefore allowing for the unique identification of only 8 nodes. That is, if this basic protocol is employed without the innovations represented by the present invention, only 8 nodes may be interconnected in a single cluster via the point-to-point infrastructure. To get around this limitation, the present invention introduces a hierarchical mechanism which preserves the single-layer identification scheme within particular clusters while enabling interconnection with and communication between other similarly situated clusters and processing nodes.

According to a specific embodiment, one of the nodes in each multi-processor cluster is an interconnection controller, e.g., interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables are then employed to determine how to get from the requesting node to the node identified from the address mapping table. That is, as discussed above, each processor (i.e., cluster node) has associated routing tables which identify a particular link in the point-to-point infrastructure which may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., processors (or CPUs), memory controllers, host bridges (or I/O bridges), etc., each of which has a unit ID.

In addition, because individual transactions may be segmented in non-consecutive packets, each packet includes a unique transaction tag to identify the transaction with which the packet is associated with reference to the node which initiated the transaction. According to a specific implementation, a transaction tag identifies the source node (3-bit field), the source node unit (2-bit field), and a transaction ID (5-bit field).

Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

According to a specific embodiment and as mentioned above, the interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

According to an even more specific embodiment which will be described with reference to FIG. 5, each cluster has five nodes (e.g., as shown in FIG. 2) which include four processors 202a–d and an interconnection controller 230, each of which is represented by a 3-bit node ID which is unique within the cluster. As mentioned above, each processor (i.e., cluster node) may represent a number of sub-units including, for example, CPUs, memory controllers, etc.

Figure 5:
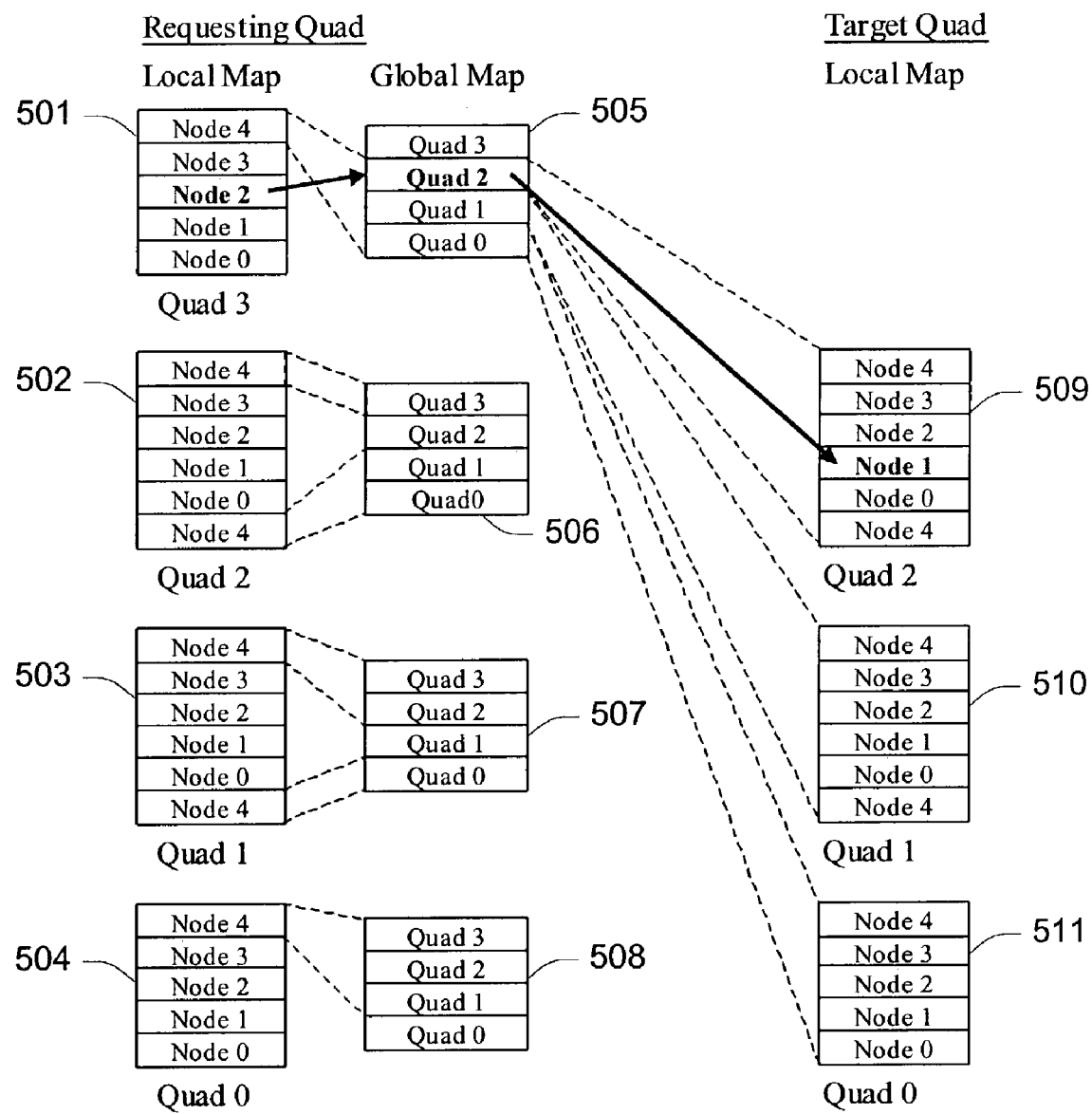
FIG. 5 is a diagrammatic representation of a memory mapping scheme for use with various embodiments of the invention.

An illustration of an exemplary address mapping scheme designed according to the invention and assuming such a cluster configuration is shown in FIG. 5. In the illustrated example, it is also assumed that the global memory space is shared by 4 such clusters also referred to herein as quads (in that each contains four local processors). As will be understood, the number of clusters and nodes within each cluster may vary according to different embodiments.

To extend the address mapping function beyond a single cluster, each cluster maps its local memory space, i.e., the portion of the global memory space associated with the processors in that cluster, into a contiguous region while the remaining portion of the global memory space above and below this region is mapped to the local interconnection controller(s). The interconnection controller in each cluster maintains two mapping tables: a global map and local map. The global map maps outgoing requests to remote clusters. The local map maps incoming requests from remote clusters to a particular node within the local cluster.

Referring now to FIG. 5, each local cluster has a local memory map (501–504), which maps the local memory space (i.e., the contiguous portion of the global memory space associated with the local processors) into the respective nodes and maps all remote memory spaces (i.e., the remainder of the global memory space) into one or two map entries associated with the local interconnection controller(s), e.g., Node 4 of Quad 3. Each node in the local cluster has a copy of the local map. The interconnection controller in each cluster also maintains a global map (505–508) relating these remote memory spaces with each of the other clusters in the system. Each interconnection controller uses its copy of the local map (509–511) to map requests received from remote clusters to the individual nodes in its cluster.

An exemplary transaction described with reference to FIG. 5 may be illustrative. In this example, Node 2 in Quad 3 generates a request that maps (via map 501) to the local interconnection controller (i.e., Node 4). When the interconnection controller receives this request, its global map 505 maps the address to Quad 2. The interconnection controller then forwards the request to Quad 2. The interconnection controller at Quad 2 uses its local memory map to determine the proper node to target for the request—Node 1 in this example.

In a particular implementation, each processor or cluster node is limited to eight memory map registers. The scheme described above with reference to FIG. 5 requires four entries for the local memory space and at most two registers for remote space. Therefore, according to more specific embodiments, the two remaining entries can be used to subdivide regions. The eight mapping register limit requires that all memory local to a quad be allocated within a contiguous block. The interconnection controller's local memory map in such embodiments is also eight entries. However, the size of the interconnection controller's global map size is determined by the number of clusters in the system. According to various embodiments, the memory mapped I/O space is mapped by an identical set of mapping registers.

As described above, on the local cluster level, information from address mapping tables is used to identify the appropriate link on which to transmit information to a destination node within the cluster. To effect transmissions between clusters using the global mapping described above, a similar mechanism is needed. Therefore, according to various embodiments, in addition to the local routing tables associated with each node in a cluster, the interconnection controller maintains global routing information which maps the other clusters in the system to the various point-to-point transmission links interconnecting the clusters (e.g., links 111 of FIG. 1A).

According to a specific embodiment of the invention, two types of local routing tables are employed: one for directed packets and one for broadcast packets. Each table (e.g., tables 406 of FIG. 4) maintains a mapping between target nodes and links. For directed packets, a separate table is used for request and for responses. This allows responses to be routed back to the requester along the same path as the request. Maintaining the same route simplifies debugging and is not required for correctness. For broadcast packets, the corresponding table indicates on which links the broadcast packet is forwarded. A broadcast packet may thus be routed to multiple links.

In a particular implementation of the interconnection controller of the present invention, its local tables map a local destination node to one of four links for directed packets and any number of links for broadcast packets. The interconnection controller also maintains a global routing table which maps remote destination clusters to a particular remote link. According to a particular embodiment, the interconnection controller also supports multicast of packets at the global routing level.

Figures 6A, 6B:
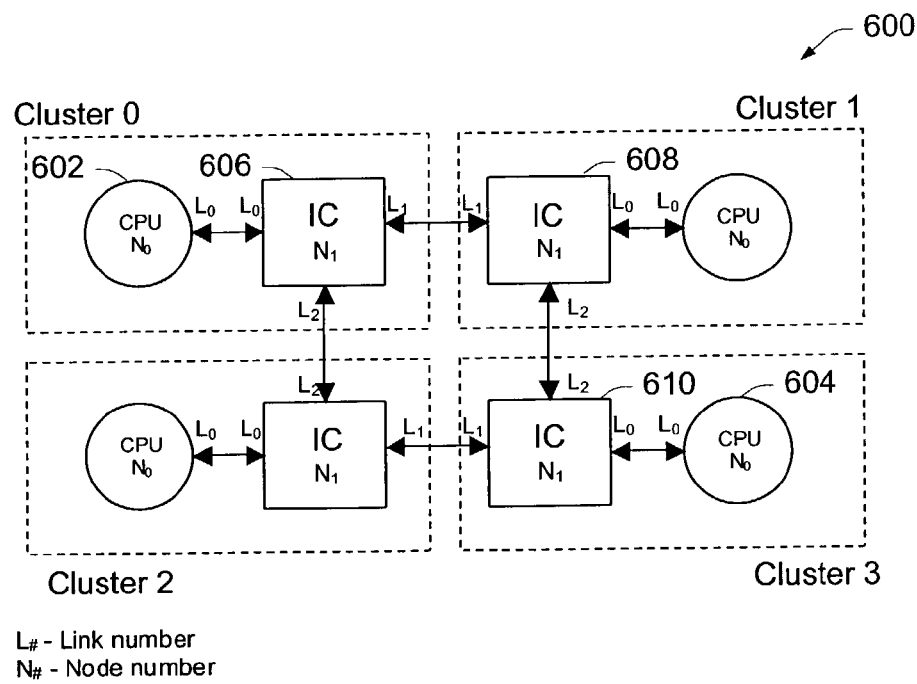
FIG. 6A is a simplified block diagram of a four cluster system for use with various embodiments of the invention.
FIG. 6B is a combined routing table including routing information for the four cluster system of FIG. 6A.

A specific embodiment of a routing mechanism designed according to the present invention will now be described with reference to FIGS. 6A and 6B. System 600 of FIG. 6A includes four clusters each having a plurality of local nodes including nodes $N_0$ and $N_1$. The table of FIG. 6B combines all of the local and global routing tables of the system for illustrative purposes.

As part of an exemplary transaction, a CPU 602 at node $N_0$ in Cluster 0 generates a packet directed to a CPU 604 at node $N_0$ in the Cluster 3. This packet could be, for example, a memory request that maps to a memory controller at that node. Because CPU 602 has no knowledge of anything outside of its cluster, it generates the packet targeting node $N_1$ in Cluster 0 (i.e., the local interconnection controller 606) as the destination. As discussed above, this is due to the fact that the local memory map owned by node $N_0$ (see the relevant portion of the table of FIG. 6B) identifies node $N_1$ as corresponding to all memory owned by remote clusters. Interconnection controller 606 receives the packet, uses its global address map (e.g., as described above) to determine that the final destination of the packet is Cluster 3, and generates a remote packet targeting Cluster 3. Then, using its global routing table (i.e., relevant portion of FIG. 6B), interconnection controller 606 determines that this packet must be sent out on link $L_1$. Similar to the local routing mechanism described above, information identifying the source and destination cluster is appended to the packet.

When interconnection controller 608 at Cluster 1 receives the packet, it also determines that the packet is destined for Cluster 3 and determines from its global routing table (FIG. 6B) that link $L_2$ must be used to send the packet. Interconnection controller 610 at Cluster 3 receives the packet, determines that the packet is targeting the local cluster, and uses its local routing table (FIG. 6B) to determine that local link $L_0$ must be used to send the packet to its destination. CPU 604 at node $N_0$ then receives the packet via link $L_0$. According to specific embodiments in which the node ID space is a 3-bit ID space, this multi-level routing mechanism can be extended to eight local nodes with no specific limit on the number of clusters.

Embodiments of the invention also address the issue of transaction identification in a system having a plurality of multi-processor clusters. In general, the importance of the unique identification of transactions in a multi-processor environment is understood. And where the transaction identification or tag space is limited, mechanisms to extend it are needed to enable the interconnection of more than the maximum number of processors supported by the limited tag space. That is, in an environment with a plurality of clusters operating with identical local transaction tag spaces, there is a potential for more than one transaction to be generated in different clusters simultaneously with the identical tag. Where those transactions occur between nodes in different clusters, the potential for conflict is obvious. Therefore, embodiments of the present invention provide mechanisms which extend the local tag spaces such that each transaction in the multi-cluster system is uniquely identified.

More specifically, these embodiments map transactions from the local transaction tag space to a larger global transaction tag space. As described above, the local tag space is specified using the node ID, the unit ID, and a transaction ID. On top of that, the global tag space is specified using a global cluster ID and a global transaction ID. According to one embodiment, the interconnection controllers in the system use their pending buffers to simplify the allocation and management of the mapping and remapping actions. According to an even more specific embodiment and as will be described, additional protocol management is used to maintain the uniqueness of the global transaction tags.

According to a specific embodiment, all transactions within a cluster are tagged with a unique ID generated by the requesting node. The processors in each cluster which are not the interconnection controller support a 3-bit node ID, a 2-bit unit ID and a 5-bit transaction ID. The combination of these fields creates a 10 bit tag which is unique within the cluster. The unit ID represents sub-units within a node. It should be noted that a particular node may or may not include a processor as one of its sub-units, e.g., the node might contain only memory.

According to one embodiment, to extend to the transaction tag space beyond the local cluster, each cluster's interconnection controller maps each its cluster's local tag space into the global tag space using a Q-bit Cluster ID and a T-bit Transaction ID. In the exemplary system in which each cluster has a 5-bit transaction ID and there are four clusters, T might be 7 and Q might be 2.

Figure 7:
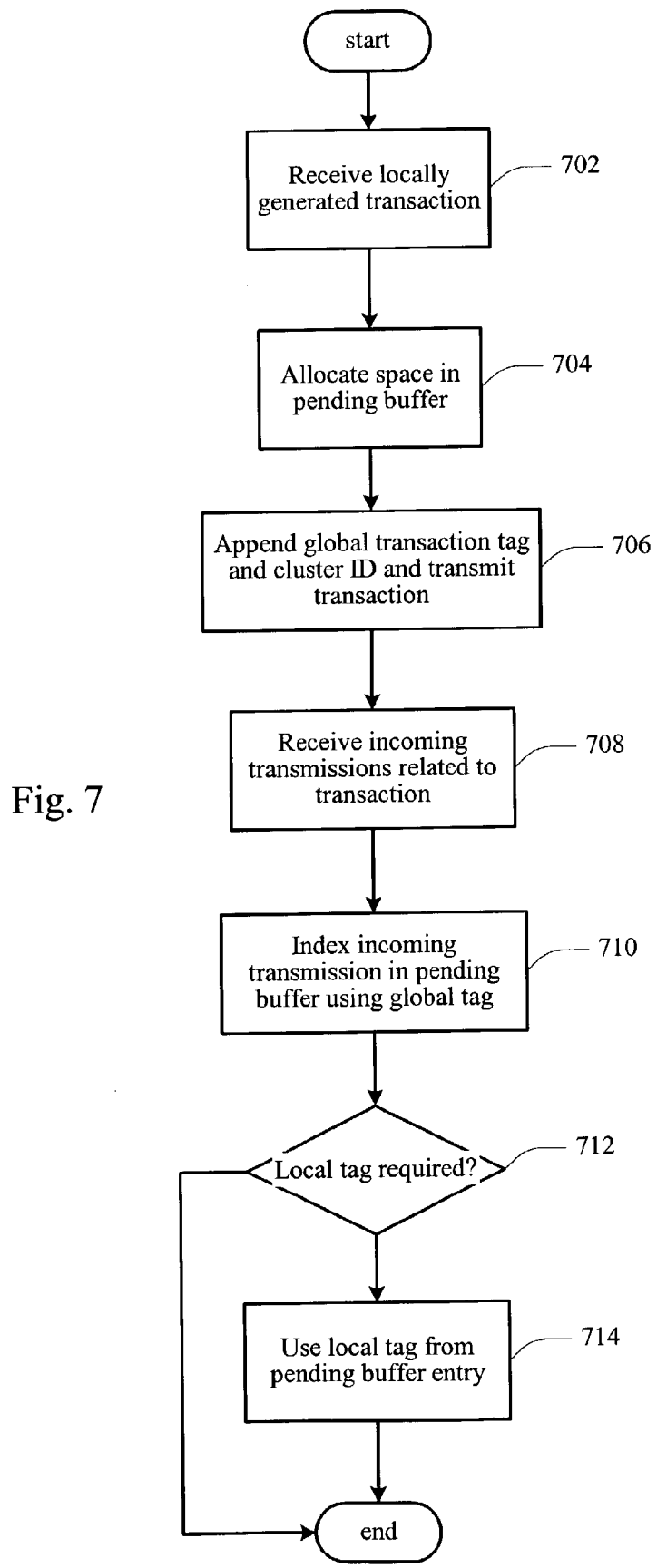
FIGS. 7 and 8 are flowcharts illustrating transaction management in a multi-cluster system according to various embodiments of the invention.

According to one embodiment illustrated in FIG. 7, the local to global mapping process is accomplished as follows. New outgoing transactions, i.e., locally generated transactions involving remote clusters, are received by the cluster's interconnection controller (702) and are allocated an entry in the protocol engine's global pending buffer (704), e.g., pending buffer 309 of FIG. 3. The buffer entry identifier is unique for each such transaction, and therefore, according to various embodiments, is used as a unique global transaction tag. According to a specific embodiment, the number of entries in the pending buffer cannot exceed the size of the global transaction tag space for this mechanism. Also included in the pending buffer entry is the local transaction tag. Thus, the information mapping the transaction from the local tag space to the global tag space is implicitly contained in the pending buffer. The outgoing transaction is then tagged with the global transaction tag, along with a cluster ID that is specified during initial system configuration (706). When incoming transmissions associated with the transaction are received (708), the global transaction tag is used to index into the global pending buffer (710). If a local transaction tag is required (712), the local tag from the indexed pending buffer entry is used to tag the transaction (714).

Figure 8:
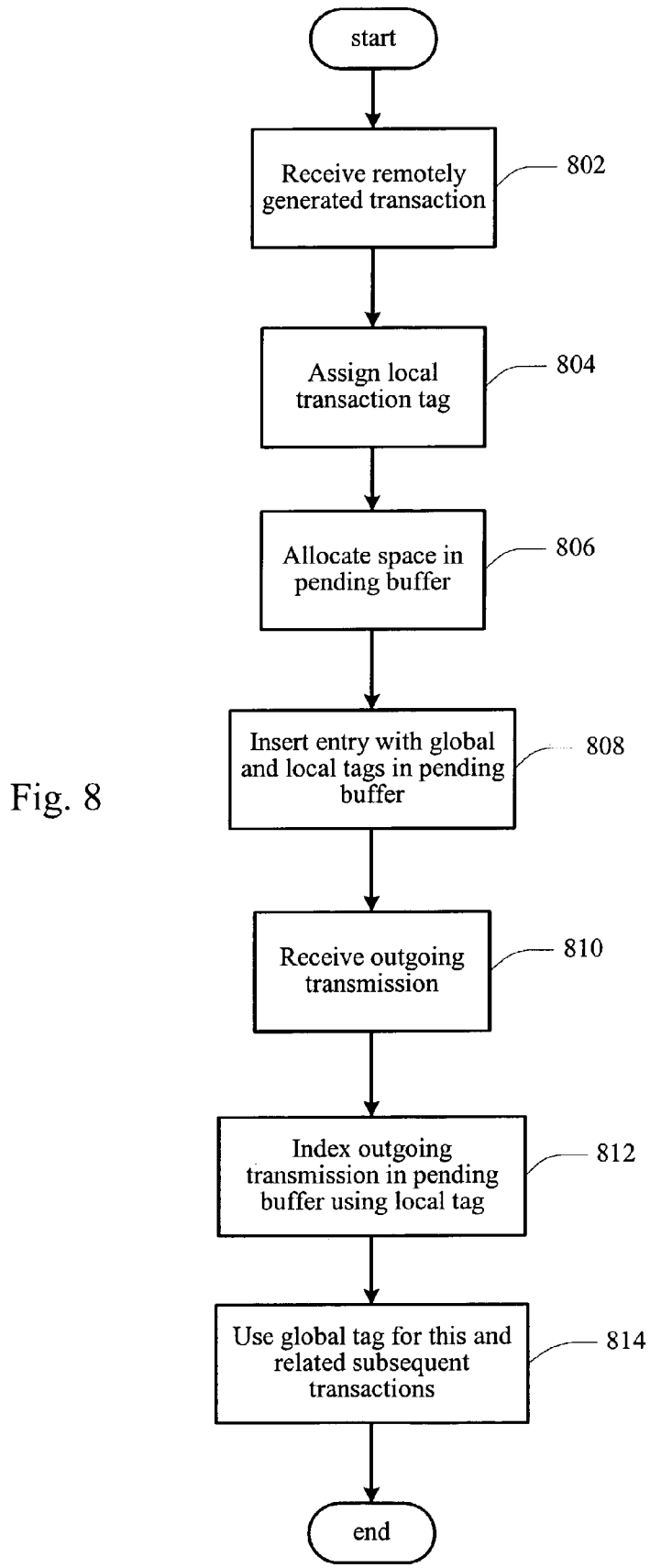

According to a specific embodiment illustrated in FIG. 8, the global to local mapping process is as follows. New incoming transactions, i.e., remotely generated transactions involving the local cluster, are received by the local cluster's interconnection controller (802) and assigned a local transaction tag using a similar mechanism as described above (804). In this case, a pending buffer entry is allocated in the protocol engine's local pending buffer (806), and an entry containing the global tag is inserted into the newly allocated pending buffer entry (808). When outgoing transmissions associated with the transaction are received (810), the local transaction tag is used to index into the local pending buffer to obtain the proper global tag (812) which is used if subsequent outgoing transmissions are required (814).

Figure 9:
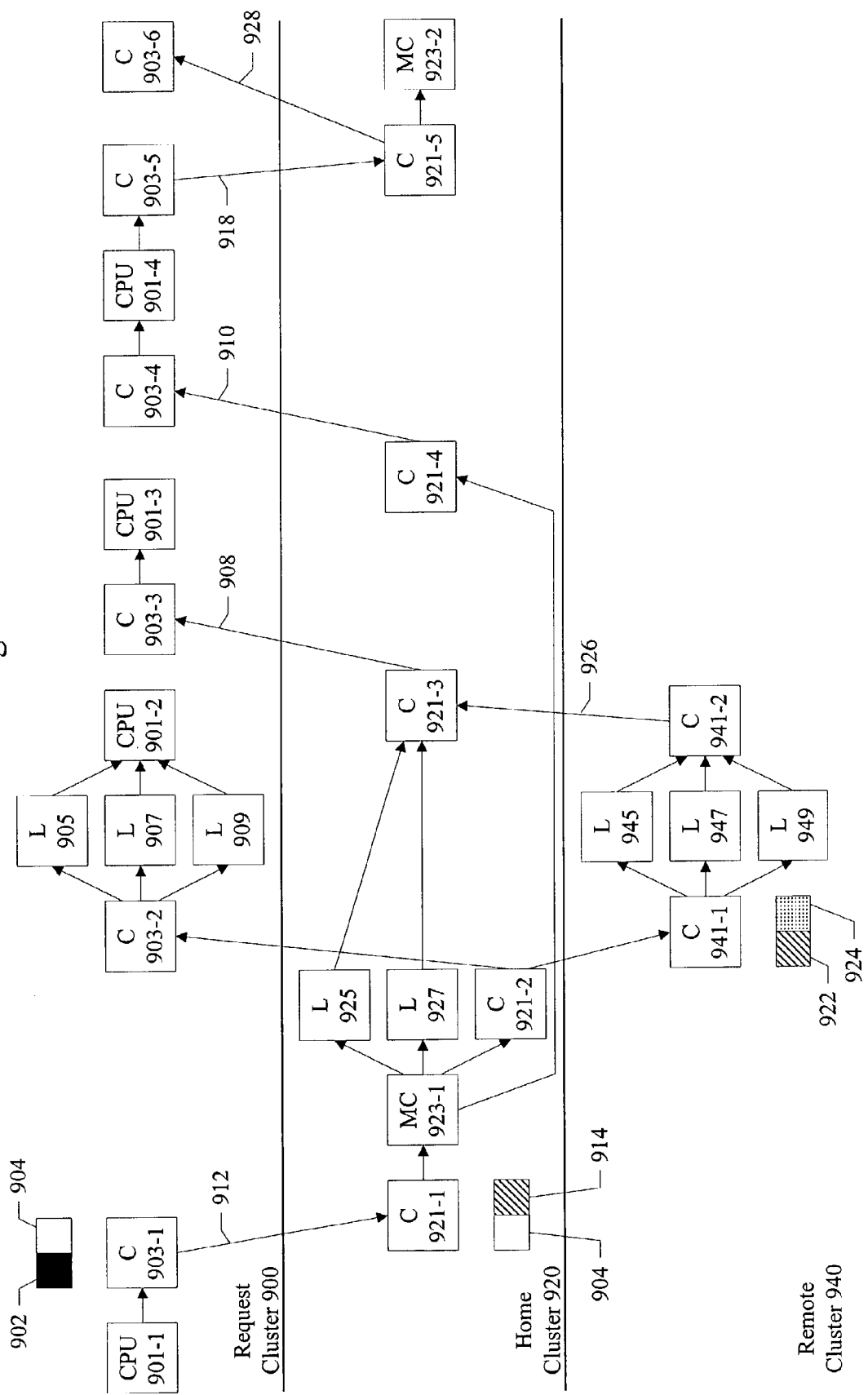
FIG. 9 is a diagrammatic representation of communications relating to an exemplary transaction in a multi-cluster system.

An example of the tag mapping mechanisms of a specific embodiment of the invention will now be described with reference to FIG. 9. FIG. 9 is a diagrammatic representation depicting the transactions for a data request from a local processor sent to a non-local cluster using an interconnection controller. It will be understood that the transactions depicted are merely exemplary and should not be used to limit the scope of the invention. The multi-cluster system includes a request cluster 900, a home cluster 920, and a remote cluster 940. The home cluster 920 and the remote cluster 940 are referred to herein as non-local clusters. Processors and interconnection controllers associated with local and non-local clusters are similarly referred to herein as local processors, local interconnection controllers, non-local processors, and non-local interconnection controllers, respectively.

According to various embodiments, processor 901-1 in a local cluster 900 sends a data access request such as a read request to an interconnection controller 903-1. The requesting node 901-1 generates the request with a local tag (e.g., tag 902) in the cluster's local tag space. The interconnection controller 903-1 maps the outgoing request into the global tag space (e.g., using global tag 904) and the mapping is saved in the pending buffer (e.g., buffer 309 of FIG. 3) of interconnection controller 903-1 as described above (e.g., table insertion: local tag 902/global tag 904). Interconnection controller 903-1 then forwards the request to an interconnection controller 921-1 in a home cluster 920. Incoming responses associated with the transaction (e.g., 908 and 910) are mapped from the global tag space back to the local tag space using a table lookup in the interconnection controller 903's pending buffer.

At home cluster 920, incoming requests (e.g., 912) are mapped by interconnection controller 921-1 into the local tag space (e.g., using tag 914) and the mapping is saved in the pending buffer of controller 921-1 (e.g., table insertion: global tag 904/local tag 914). Outgoing responses from home cluster 920 (e.g., 908 and 910) are mapped from the local tag space back to the global tag space using a table lookup in interconnection controller 921's pending buffer. Incoming responses to the home cluster are mapped from the global tag space back to the local tag space using a table lookup in interconnection controller 921's pending buffer.

In this exemplary transaction, interconnection controller 921-1 forwards the access request to a memory controller 923-1 also associated with home cluster 920. At this point, memory controller 923-1 locks the memory line associated with the request. In one example, the memory line is a unique address in the memory space shared by the multiple processors in request cluster 900, home cluster 920, and remote cluster 940. Memory controller 923-1 generates a probe associated with the data access request and forwards the probe to local nodes associated with cache blocks 925 and 927 as well as to interconnection controller 921-2.

Interconnection controller 941-1 at remote cluster 940 maps global tags (e.g., tag 922) into its local tag space using local tags (e.g., tag 924). Responses (e.g., 926) are mapped from the local tag space back to the global tag space using a table lookup in interconnection controller 941's pending buffer. In response to the probe from home cluster 920, interconnection controller 941-1 probes local nodes associated with cache blocks 945, 947, and 949. Similarly, interconnection controller 903-2 associated with request cluster 900 receives a probe and forwards the probe to local nodes associated with cache blocks 905, 907, and 909. Processor 901-2 receives probe responses from the local nodes associated with cache blocks 905, 907, and 909.

According to various embodiments, interconnection controller 921-3 accumulates probe responses and sends the probe responses to interconnection controller 903-3, which in turn forwards the probe responses to the processor 901-3. Interconnection controller 921-4 also sends a memory controller read response 910 to interconnection controller 903-4, which forwards the read response to processor 901-4. After receiving all responses and the fetched data, processor 901-4 sends a source done response to interconnection controller 903-5. Interconnection controller 903-5 forwards the source done message to interconnection controller 921-5. Interconnection controller 921-5 in turn sends a source done message to memory controller 923-2.

According to a specific embodiment, interconnection controller 921-5 also acknowledges the Source Done transaction (918) with a tag release transaction (928) to controller 903-6 at the requesting cluster that allows it to reuse the tag. As described below, this acknowledgment prevents the requesting cluster from reusing a global tag until the global tag is no longer in use in the system.

It should be noted that the above-described tag mapping mechanism works for all transaction types with the exception of the Source Done transaction. In this case, the outgoing SD transaction received by the interconnection controller at the requesting cluster is tagged with the local node's identifier. As a result, the interconnection controller at the requesting cluster must search its pending buffer for an entry with a matching local tag and then use the index as the global tag. The same mechanism is required when the Source Done transaction reaches the home cluster. In this case, the pending buffer at the home quad is searched for a matching global tag and the index is used as the local tag.

According to a specific embodiment, the final tag release transaction (e.g., 928) is provided to inform the requesting cluster when a given tag may be reused. This tag release mechanism is for preventing ambiguity of Source Done (SD) transactions at the home cluster. For example, without such a mechanism, after the requesting cluster completes a transaction and a SD transaction is sent to the home cluster (e.g., 918), a new transaction can be generated at the requesting cluster with the same global tag. A transmission associated with this transaction could potentially be received at the home cluster and inserted into the home cluster pending buffer prior to the receipt of the first SD transaction as they travel on different virtual channels. Under such circumstances, the pending buffer at the home cluster would have multiple entries with the same global tag. Requiring the tag release transaction forecloses this possibility.

As described above, the interconnection controller described herein facilitates the merger of independent cache-coherent clusters into a larger cache coherent system. According to a particular embodiment, these interconnection controllers are embodied as ASIC chips and the following description assumes this. However, it should be understood that neither the interconnection engines nor their included functionalities are so limited.

According to various embodiments of the invention, protocol engines are blocks of hardware on the interconnection controller ASIC chip. The functionality of these engines are governed by associated microcode and relate generally to managing transaction flows. Generally speaking, a protocol engine looks at each packet received by the interconnection controller and makes decisions regarding the appropriate handling of the packet and any actions/response which need to be taken. Having a single protocol engine to manage transactions (e.g., as shown in FIG. 3) can be a transaction processing bottleneck.

Figure 10:
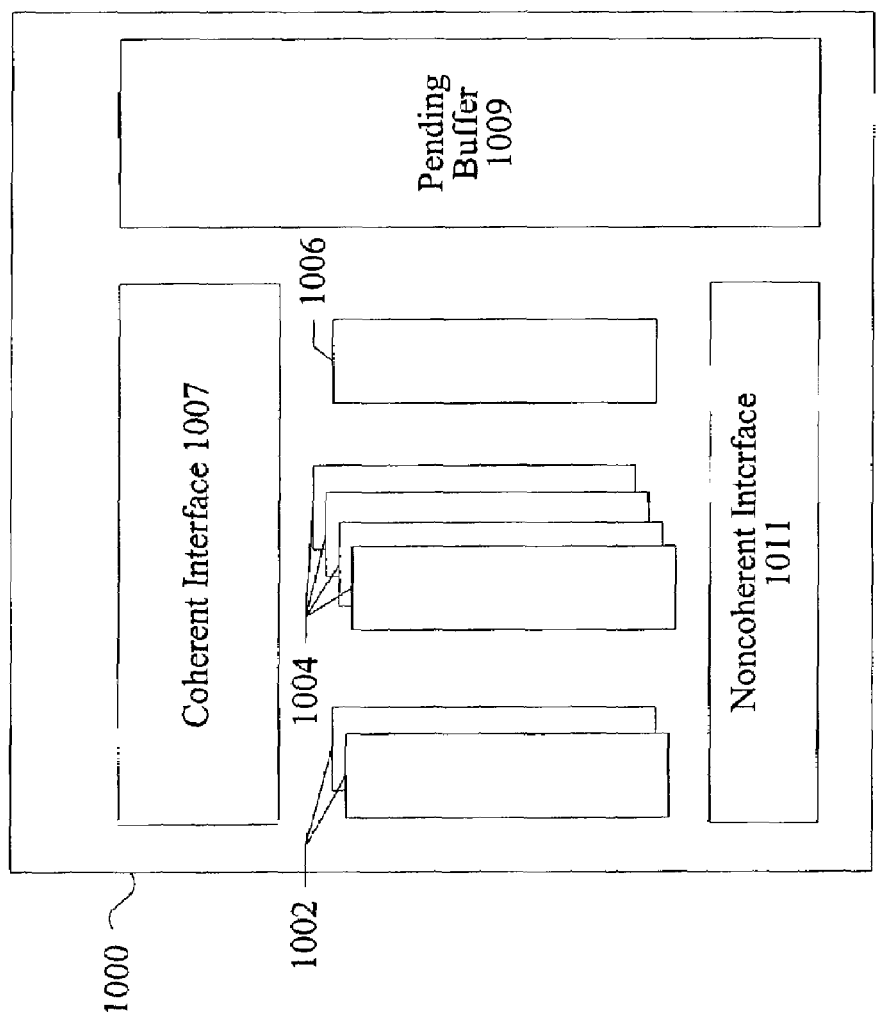
FIG. 10 is a diagrammatic representation of another exemplary interconnection controller for facilitating various embodiments of the present invention.

Therefore, as mentioned above and according to a specific embodiment, each interconnection controller comprises multiple protocol engines to improve the transaction processing throughput of the system. According to the described embodiment, each of the protocol engines comprises substantially identical hardware blocks, each being programmed by the associated microcode to perform a particular type of transaction processing. More specifically, in the described embodiment there are three different types of protocol engines in each interconnection controller which will be referred to herein as remote memory protocol engines, local memory protocol engines, and special protocol engines, respectively. FIG. 10 is a simplified block diagram of an exemplary interconnection controller 1000 designed according to such an embodiment. It will be understood that interconnection controller may be used in the processor cluster of FIG. 2 in place of interconnection controller 230.

Remote memory protocol engines (RMPEs) 1002 are responsible for processing transactions which target remote memory, i.e., memory associated with another cluster, and all subsequent transactions in that particular transaction flow. Local memory protocol engines (LMPEs) 1004 are responsible for processing transactions which target local memory, i.e., memory associated with the local cluster with which the interconnection controller is associated, and all subsequent transactions in the flow. Special protocol engine 1006 is responsible for processing interrupts, I/O accesses, configuration accesses, etc. According to the embodiment shown in FIG. 10, each interconnection controller includes 2 remote engines, 4 local engines, and one special engine. It will be understood however, that these numbers are merely exemplary, and the optimal number of each engine type may vary according to the manner in which transactions are distributed across the engines.

Interconnection controller has a coherent protocol interface 1007 that allows the interconnection controller to communicate with other processors in the cluster as well as external processor clusters. Pending buffer 1009 and non-coherent interface 1011 may have functionalities similar to those for similar processor blocks described above with reference to FIG. 3. According to various embodiments, interface 1007 is implemented either as a full crossbar or as separate receive and transmit units using components such as multiplexers and buffers. According to specific embodiments, interface 1007 may be configured to effect the routing of transaction packets to particular protocol engines according to the embodiments described below.

The foregoing describes systems in which the point-to-point links between processing nodes in each processor cluster and between clusters make up a single point-to-point architecture (also referred to from this point forward as the coherent point-to-point architecture or coherent fabric) which facilitates communication among all of the various devices in the computer system. That is, in addition to the traffic corresponding to the types of transactions described above, e.g., system memory requests generated by processors, the coherent point-to-point architecture may also carry traffic generated by or targeting I/O devices, e.g., DMA requests from I/O devices. For a relatively small number of processors and/or clusters, the coherent point-to-point architecture can easily handle this traffic. However, as the number of processors and/or clusters and I/O devices in the system increases, congestion of the coherent fabric may occur resulting in undesirable performance degradation.

Therefore, according to various embodiments of the invention, an alternate, non-coherent point-to-point architecture is provided for facilitating transactions instigated by or targeting I/O devices. Not only does this alternative non-coherent fabric address the issue of congestion in the coherent fabric, it may also provide a fail-over capability in that if one or more processing nodes in a particular cluster fails, the connectivity provided by the non-coherent fabric may still allow access to the I/O devices associated with that cluster. According to various embodiments, the non-coherent fabric provided by the present invention enables I/O devices deployed throughout the system to communicate with processing nodes and associated memory in the same cluster through multiple host bridges simultaneously.

An exemplary embodiment will now be described with reference to FIG. 11. According to this embodiment, processor clusters 1102 and 1104 and auxiliary I/O interface box 1106 employ such an alternate non-coherent point-to-point architecture. Each cluster includes four processing nodes 1108A–D and 1109A–D and interconnection controllers 1110 and 1111 interconnected via coherent point-to-point links 1112.

Figure 11:
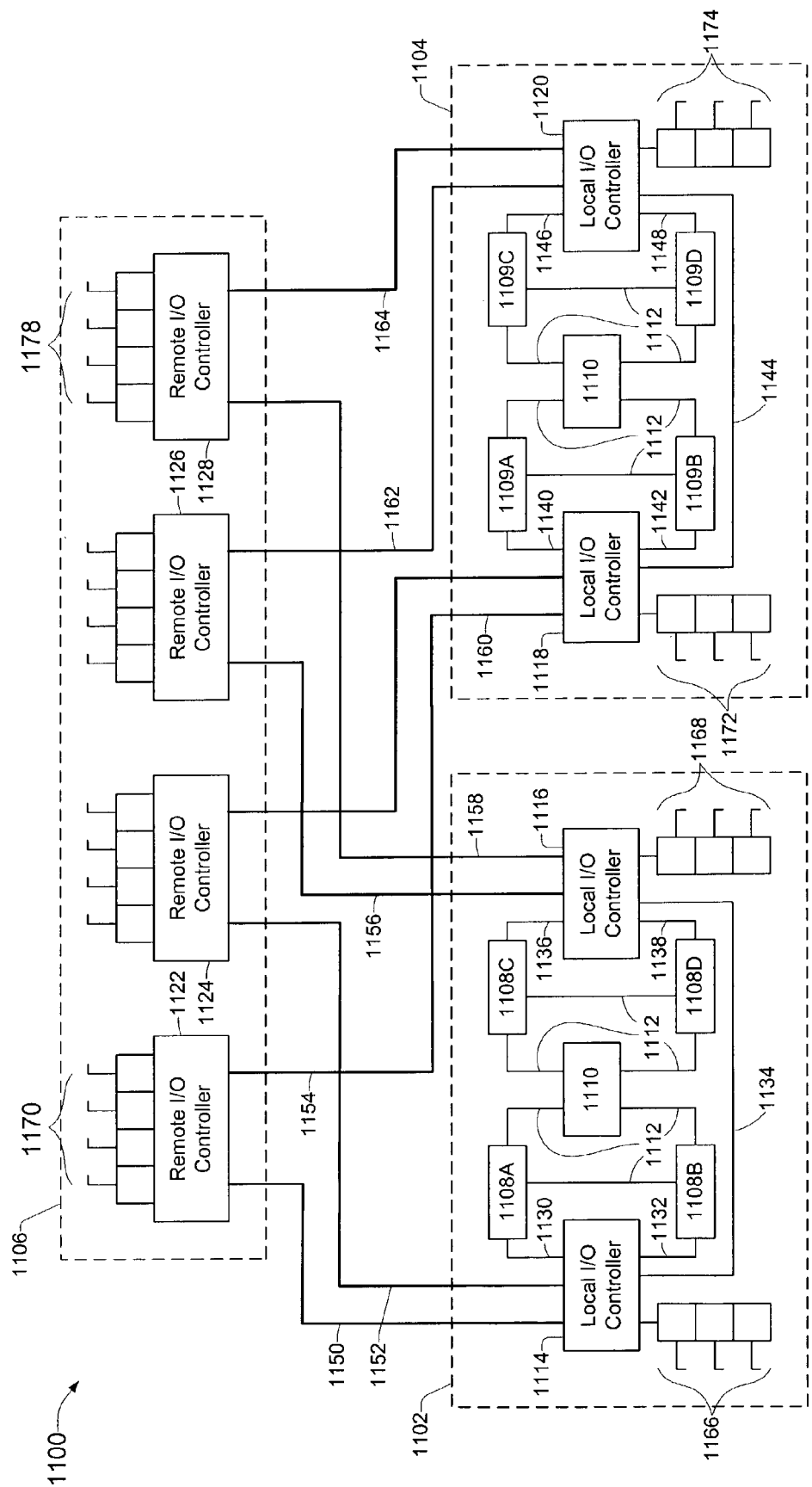
FIGS. 11–16 are diagrammatic representations of a number of computer system configurations designed according to various specific embodiments of the invention.

According to a specific embodiment, the system shown in FIG. 11 operates as described above with reference to FIGS. 1–10 to facilitate memory accesses by and communication among the processors in processing nodes 1108 and 1109. However, in contrast with the above-described system, for transactions instigated by I/O devices, the system of FIG. 11 employs a non-coherent point-to-point architecture which includes local I/O controllers 1114–1120 in clusters 1102 and 1104, remote I/O controllers 1122–1128 in interface box 1106, and non-coherent links 1130–1164. It should be noted that the coherent point-to-point links interconnecting clusters 1102 and 1104 as well as the memory banks associated with each cluster are not shown in order to not obscure the present invention.

Each local I/O controller is connected to specific processing nodes in the same cluster via the nodes' host bridges which perform the function of translating requests from the coherent domain to the non-coherent domain and back. The purpose of the local I/O controller is to externalize the signals from the host bridges to which it is connected. According to a specific embodiment, the local I/O controller allows much longer I/O connections than the longest links allowed when I/O are connected directly to specific host bridges, e.g., meters vs. inches. As will be discussed, the various I/O controllers of the present invention also allow simultaneous transactions to occur involving processing nodes within the same cluster. That is, the host bridges associated with more than one processing node may be transmitting packets to and from the non-coherent fabric simultaneously.

The local I/O controllers are connected to some number of local I/O bridges and local I/O slots for interfacing with any of a variety of I/O devices, e.g., PCI, Fiberchannel, Infiniband, Ethernet, etc. The local I/O controllers may also connect to at least one remote I/O controller (e.g., in auxiliary I/O interface box 1106) which interfaces (via corresponding I/O bridges) with remote I/O slots for interfacing with additional I/O devices. Such an auxiliary interface box is optional and may be useful where, for example, more I/O connectivity is desired than may be provided in the physical boxes enclosing each cluster. It should be understood that the connectivity shown in FIG. 11 is merely exemplary, and that the local I/O controllers and remote I/O controllers may be interconnected in a variety of ways as long as at least one path from each I/O device to all of the appropriate ranges of memory is available. In another embodiment, an I/O chain of devices could replace one or more I/O bridges.

According to a particular implementation in which there are multiple local I/O controllers in a cluster, these local I/O controllers also have an internal link between them which provides an additional path to reach the other processing nodes in the cluster without having to either go outside the box, or use part of the coherent fabric. It should be understood, however, that multiple local I/O controllers within a given cluster are not required. That is, a single local I/O controller could perform the desired function. However, for embodiments in which partitioning of nodes within a cluster is allowed, multiple local I/O controllers may be desirable to allow for the advantages of the present invention to be realized within each partition.

Referring specifically to FIG. 11, local I/O controller 1114 communicates with the host bridges in processing nodes 1108A and 1108B via links 1130 and 1132 as well as one or more local I/O devices (not shown) via I/O adapters 1166. Local controller 1116 communicates with the host bridges in processing nodes 1108C and 1108D via links 1136 and 1138 as well as one or more I/O devices (not shown) via I/O adapters 1168. Local controllers 1114 and 1116 communicate with each other via link 1134. Local controllers 1114 and 1116 also communicate with I/O devices (not shown) in interface box 1106 via links 1150–1164 and remote I/O controllers 1122–1128. Local I/O controllers 1118 and 1120 have similar connectivity to the nodes in their cluster.

In describing the operation of the various embodiments of the present invention, the terms "upstream" and "downstream" will be used. "Upstream" refers to packets in the noncoherent fabric which are directed from a particular I/O device toward a host bridge in a processing node. Such packets might correspond, for example, to a direct memory access (DMA) request generated by the I/O device. "Downstream" refers to packets in the noncoherent fabric which are directed from a particular host bridge to an I/O device. Such packets might correspond, for example, to memory mapped I/O (MMIO) or configuration commands from a processor in the host bridge's processing node to a host bus adapter associated with the I/O device.

Thus, in the embodiment shown, an I/O related upstream transaction between any I/O device and memory location in the system can occur via the non-coherent point-to-point architecture without utilizing the bandwidth of the coherent point-to-point architecture (with the exception of the path between the host bridge and the memory controller within a particular node). For downstream requests a single host bridge is used. That is, each host bridge is assigned a unique and non-overlapping part of the entire set of I/O devices in the system, which may include multiple clusters. The routing set up for I/O requests in each processor and interconnection controller designates the proper host bridge to be used for routing of a particular I/O request. In any case, in the embodiment shown, eight processing nodes are fully connected to each of 16 remote I/O controller I/O slots 1170. Local controller I/O slots 1166–1174 make use of the coherent fabric to access memory in other processor clusters. It will be understood that the connectivity shown is merely exemplary and that many different interconnection topologies may be employed within the scope of the invention. It should be noted that topologies are contemplated which may or may not require partial use of the coherent infrastructure. Examples of other connectivity schemes will be described below.

According to a specific embodiment, the local and remote I/O controllers of FIG. 11 may be implemented using the interconnection controllers described above with reference to FIGS. 3 and 10. That is, non-coherent interfaces 311 and 1011 and protocol engine 305 and 1006 may be configured to facilitate transactions involving system I/O devices in much the same way that, as described above, communications between processing nodes and memory are facilitated via the interconnection controllers, i.e., through the use of address, routing, and transaction mappings between global and local spaces.

According to a particular implementation using the controller of FIG. 10, the special protocol engines in the local and remote I/O controllers are configured to implement a non-coherent routing protocol which is characterized by a set of packet ordering rules. According to a specific embodiment, the non-coherent routing protocol is based on the protocol described in *HyperTransport I/O Link Specification, Revision* 1.04, published by the HyperTransport Technology Consortium, the entirety of which is incorporated herein by reference for all purposes. In addition, these protocol engines are further configured to implement the various hierarchical mechanisms described above (with reference to FIGS. 1–10) which preserve the single-layer identification scheme within particular clusters while enabling interconnection with and communication between other similarly situated clusters, processing nodes, and I/O devices.

According to the non-coherent protocol, data are transmitted over three different types of virtual channels, posted, non-posted, and response channels. Each has corresponding ordering rules specified by the non-coherent protocol. Virtual channels are used to prevent blocking between requests. However, in order to properly maintain I/O ordering, some rules are added which create dependencies between packets (in the same I/O stream) in different virtual channels. Each I/O bridge or I/O device creates one unique I/O stream. The ordering rules are as follows:

A posted request may or may not pass a posted request unless a PassPW bit is 0, in which case it cannot pass.

A posted request may pass a nonposted request and a response.

A nonposted request may or may not pass a posted request unless the PassPW bit is 0

A nonposted request may pass a nonposted request or a response

A response may or may not pass a posted request unless the PassPw bit is 0

A response may pass a nonposted request and a response.

The PassPW bit is set as by the device or the I/O bridge as a function of the Relaxed Ordering bit in PCI. When strict ordering is required by the device, the Relaxed Ordering bit is clear.

In addition, the special protocol engines in at least some of the I/O controllers of the present invention are configured to implement logic which preserves packet ordering and conformity with the non-coherent protocol despite the fact that multiple host bridges are communicating with various I/O devices at the same time.

The local I/O controllers and remote I/O controllers "decide" which link to employ using their internal memory mapping and routing tables as described above with reference to the interconnection controllers of FIGS. 3 and 10. That is, for example, a DMA request from one of the remote I/O bridges 1170 associated with remote I/O controller 1122 targeting memory associated with processing node 1109C would be received by local I/O controller 1118 and mapped to link 1144 to local controller 1120. Local I/O controller 1120 then uses its own local routing tables to forward the request to processing node 109C via link 1146.

If, on the other hand, the target address was associated with processing node 1108B, the path might go from remote I/O controller 1122 through link 1150 to local I/O controller 1114, to processing node 1108B via link 1132. A third case for a DMA request from local I/O bridges 1166 associated with local I/O controller 1114 targeting memory associated with processing node 1108D would be received by controller 1114 and mapped to link 1134 to local I/O controller 1116 to link 1138 to processing node 1108D. If a local bridge 1166 targets memory associated with processing node 1109D, the request from local I/O controller 1114 would be received by either processing node 1108A (via link 1130), or processing node 1108B (via link 1132), and then routed in the coherent domain via interconnection controllers 1110 in clusters 1102 and 1104 to processing node 1109D.

In any case, it should be noted that the mapping tables in the various local I/O controllers and remote I/O controllers may be set up as desired to distribute the traffic over the available links in the most advantageous manner for a given application.

Figure 12:
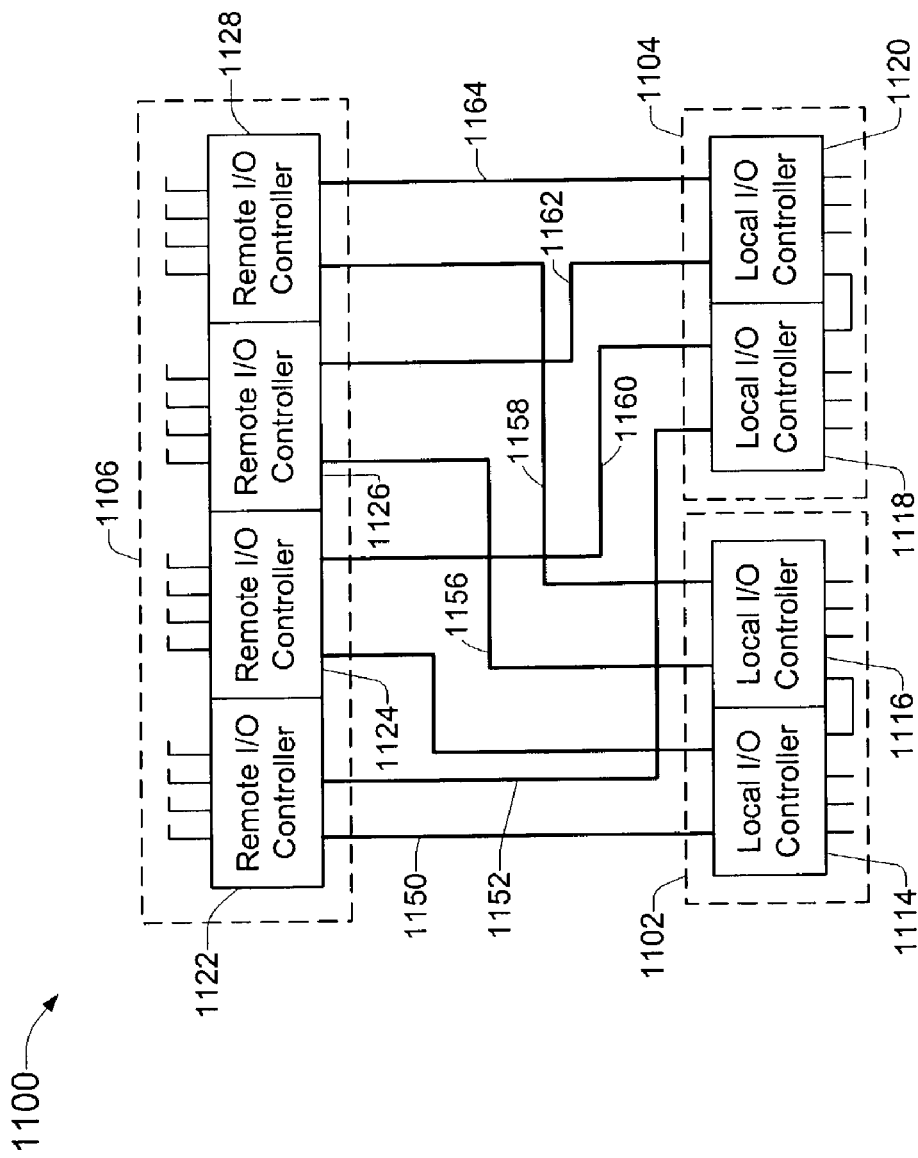

As mentioned above, the connectivity provided by various embodiments of the non-coherent fabric described herein may vary considerably and remain within the scope of the invention. A representative sample of some alternative configurations are shown in FIGS. 13–16. It should be noted that these drawings have been simplified for purposes of clarity, omitting representations of the clusters and their internal connections, and showing the connectivity between the various local and remote I/O controllers in the system. FIG. 12 is an example of this simplification. That is, the interconnection diagram of FIG. 12 is equivalent to the system shown in FIG. 11. The reference numbers indicate how the I/O controllers depicted correspond to those in FIG. 11. The diagrams of FIGS. 13–16 use the same conventions.

Figure 13:
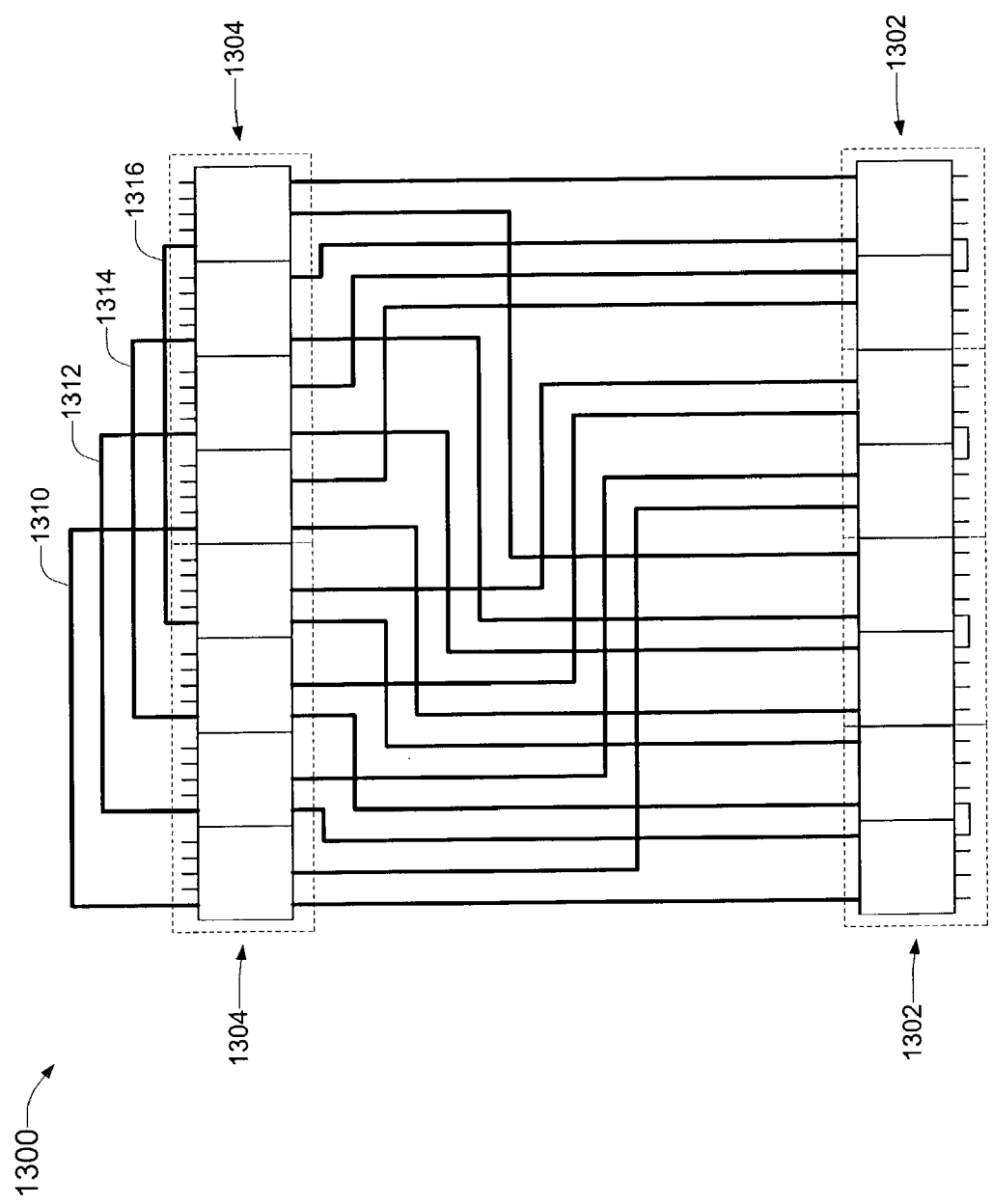

FIG. 13 shows a system configuration 1300 according to a specific embodiment of the invention in which 16 processing nodes are fully connected to 56 I/O slots. That is, four processor clusters similar to the clusters of FIG. 11 and two interface boxes similar to the interface boxes of FIG. 11 are interconnected with a non-coherent fabric using 8 local I/O controllers 1302 (each having 3 associated I/O slots) and 8 remote I/O controllers 1304 (each having 4 associated I/O slots). The terms "fully connected" or "fully interconnected" are used herein to indicate that any remote I/O device connected to 1304 in the system can interact with any of the memory associated with any of the processing nodes predominantly using the non-coherent point-to-point architecture. According to the embodiments shown, portions of the coherent fabric are only used when I/O devices coupled directly to local controllers target memory associated with remote processor clusters.

Figure 14:
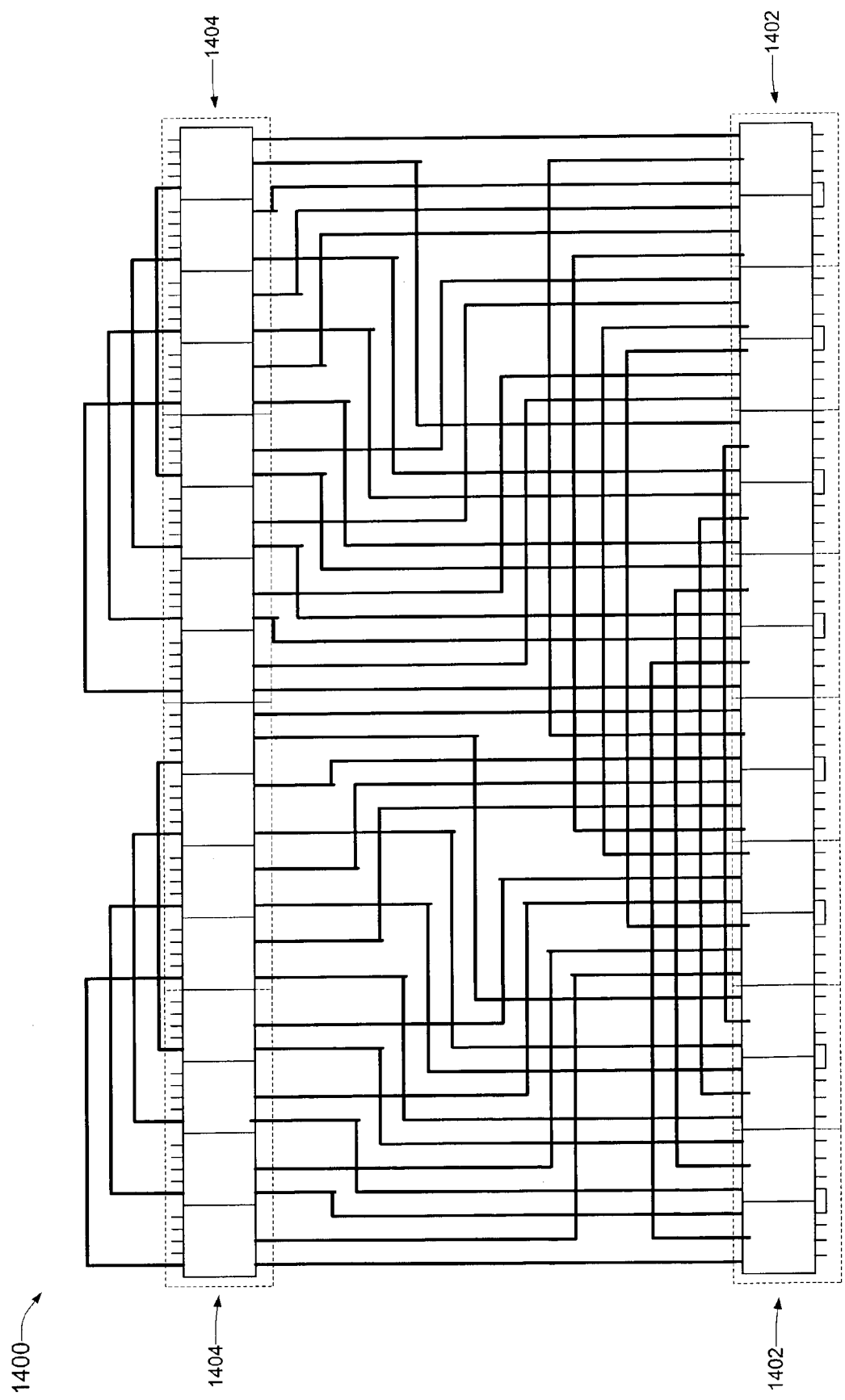

Similarly, FIG. 14 shows a system configuration 1400 according to another specific embodiment of the invention in which 32 processing nodes are fully connected to 112 I/O slots. That is, eight processor clusters similar to the clusters of FIG. 11 and four interface boxes similar to the interface boxes of FIG. 11 are interconnected with a non-coherent fabric using 16 local I/O controllers 1402 (each having 3 associated I/O slots) and 16 remote I/O controllers 1404 (each having 4 associated I/O slots).

Figure 15:
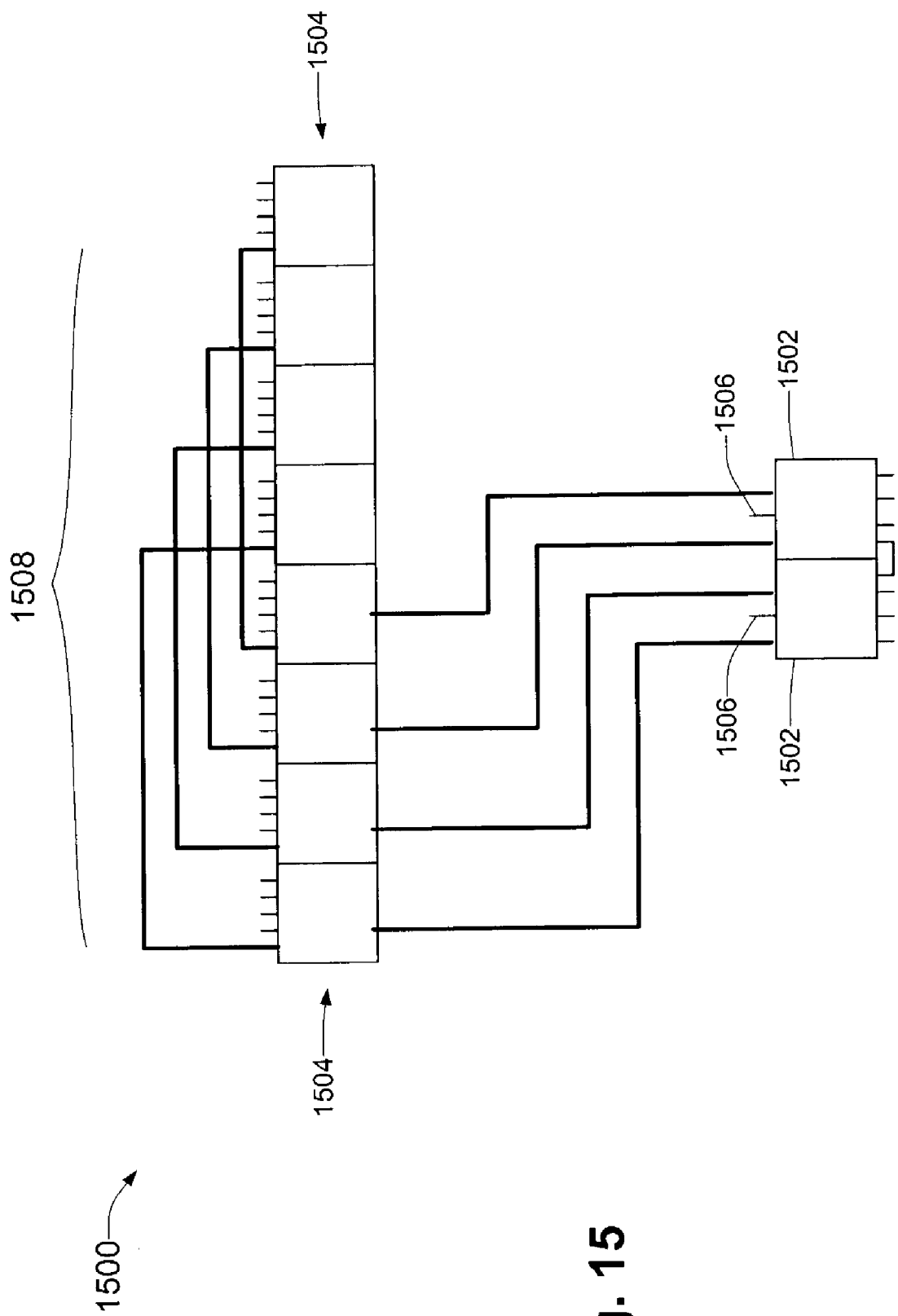
Figure 16:
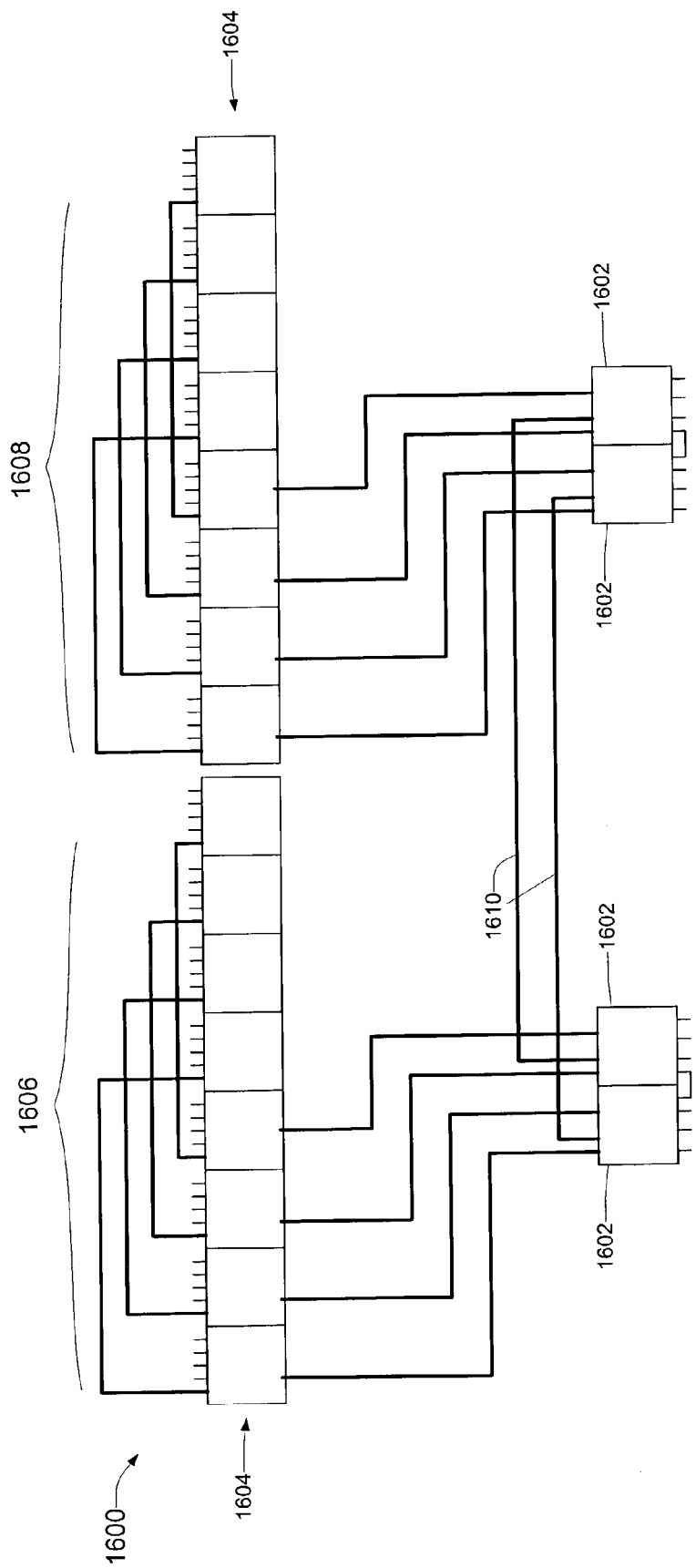

FIG. 15 shows yet another system configuration 1500 in which the four processing nodes of a single cluster are fully interconnected with 38 I/O slots using two local I/O controllers 1502 and 8 remote I/O controllers 1504 in two interface boxes interconnected by links 1508. According to a similar embodiment, up to 16 additional I/O slots could be added to this configuration by taking advantage of two additional links 1506 on local I/O controllers 1502. FIG. 16 shows a further system configuration 1600 in which the eight processing nodes of a two clusters are fully interconnected with 76 I/O slots using four local I/O controllers 1602 and 16 remote I/O controllers 1604 in four interface boxes. Links 1606 and 1608 extend the number of slots. Links 1610 allow all I/O associated with remote I/O controllers 1604 to directly address each memory while avoiding use of the coherent fabric. In similar fashion, links 1610 allow all I/O attached to local I/O controllers to also directly address each memory while avoiding the coherent fabric. As mentioned above, the system configurations shown in FIGS. 11–16 are merely exemplary and are intended to illustrate only a few of the configurations within the scope of the present invention. It should also be noted that various configurations may include links between local I/O controllers in different clusters (e.g., see FIGS. 14 and 16), and/or links between remote I/O controllers in different interface boxes (e.g., see FIGS. 13–16).

Also as mentioned above, the extension of the non-coherent domain represented by the various embodiments of the invention could potentially result in subsequent transactions targeting a particular memory range being initiated before the data written to that memory range in an earlier transaction is globally visible, i.e., in contravention of the ordering rules inherent in the non-coherent protocol. This is particularly true for some of the paths requiring multiple hops in the system. Therefore, according to specific embodiments of the present invention, additional logic is implemented in specific I/O controllers (depending on the connectivity) to ensure that this does not occur. A little background regarding the nature of I/O operations will be useful in discussing the operation of this additional logic.

There are typically three phases associated with an I/O operation, a request or command phase, a data phase, and a completion or status phase. In the command phase, a CPU writes a command to or "rings the doorbell" of a host bus adapter associated with an I/O device occupying a particular I/O slot (indicating a new command has been added to a queue). In the data phase, the host bus adapter issues a series of reads/writes moving the requested data from/to main memory. When the host bus adapter has transferred all of the data, it either sets a flag in its own memory indicating the status of the operation as complete, or generates an interrupt indicating completion to the CPU.

In the case of an interrupt, given that the transferred data and the interrupt might employ different paths, and that the interrupt path might find considerably less traffic than the path on which the data are being transmitted, it is possible that the interrupt will be received before all of the transferred data find their way to memory. In the case of a flag being set, the CPU polls the flag until it sees that it's been set. Again, it is possible that the CPU will see the flag as set before all the data are stored in memory.

Figure 17:
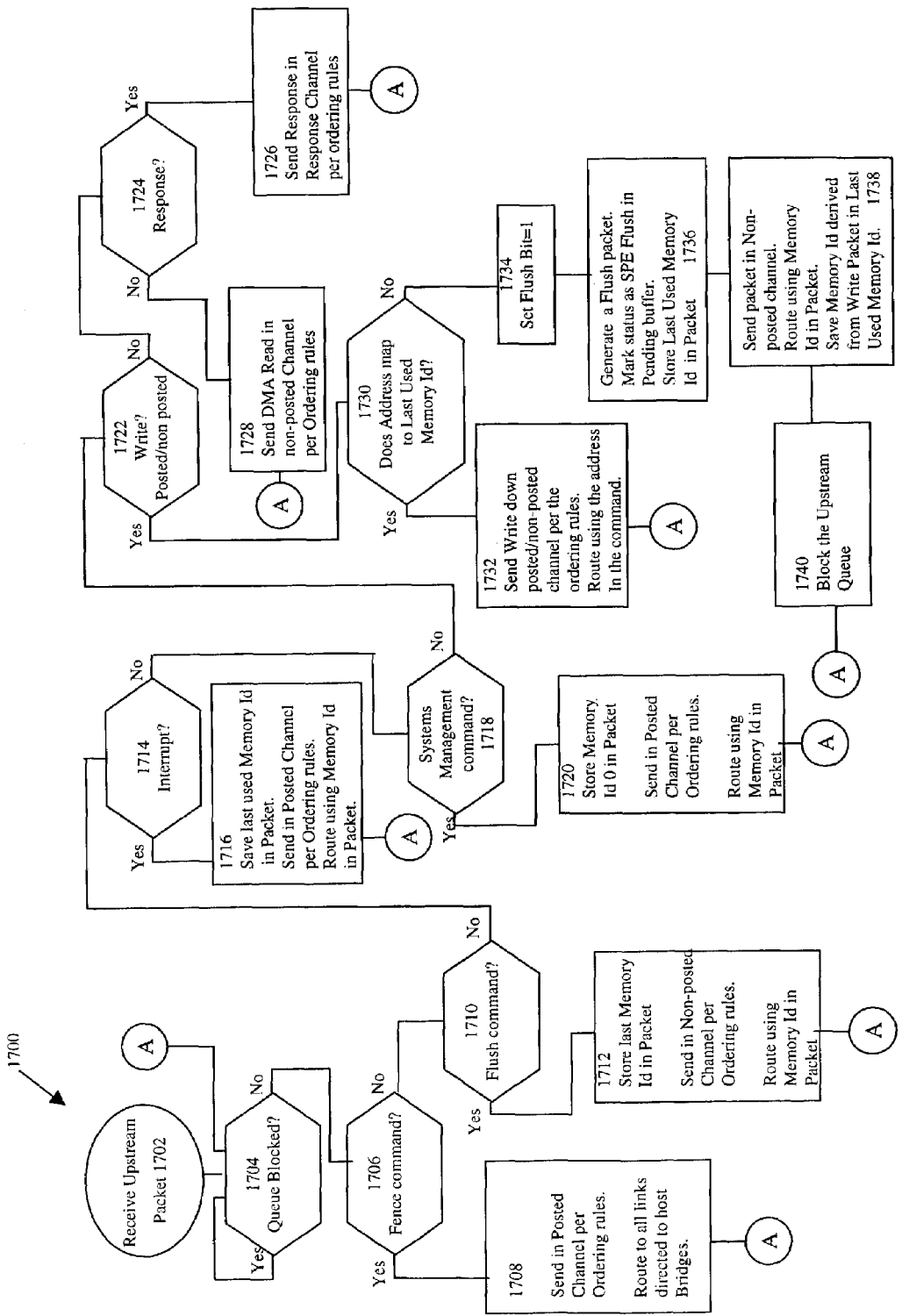
FIG. 17 is a flowchart illustrating the operation of packet ordering logic for upstream packets according to a specific embodiment of the present invention.

Referring now to FIG. 17, flowchart 1700 illustrates the operation of logic implemented in the protocol engine(s) of the I/O controllers of specific embodiments of the present invention which avoids the above-described situations and others, thus facilitating conformity with the non-coherent protocol's ordering rules. According to a specific embodiment, the logic described below operates on each of the I/O controller's I/O interfaces attached to bridges or other devices simultaneously and independently. For example, in the embodiment of FIG. 11, the logic operates on the packets received from each of the I/O adapters or bridges 1166–1178.

For each upstream packet received (1702), i.e., a packet directed from an I/O device to the host bridge of a processing node, it is determined whether the queue associated with the particular link is blocked (1704) by actions leading to 1740. The queue is unblocked by actions shown in FIG. 18. Blocking prevents further packets from being processed. It is determined whether the packet is a fence command (1706). A fence command is used to ensure that all prior posted write requests are stored in memory, regardless of the sender, before subsequent requests are handled, i.e., a "fence" is erected between the requests preceding the fence command and those that come after. This is accomplished by sending the fence command in a posted channel to links that are on a path to a host bridge. The host bridges then queue subsequent requests until the fence command is complete. If the packet is determined to be a fence command, it is sent in a posted channel (1708).

If the packet received is not a fence command (1706) it is determined whether the packet is a flush command (1710). If the packet is determined to be a flush command, the last used memory Id is stored in the packet (1712). The memory Id comprises the high order 8 address bits of the memory address stored in 1738. The flush command is sent in a non-posted channel and is routed based on the memory Id stored in the packet (1712).

If the packet is not a flush command (1710), it is determined whether the packet is an interrupt (1714). If the packet is determined to be an interrupt (e.g., by reference to the higher order bits in the address), the last memory Id (1738) is saved in the interrupt packet which is then sent in a posted channel and routed using the memory Id in the packet 1716). This routing assures that all previous posted writes to memory will have been stored in memory before the interrupt is signaled.

If the packet is not an interrupt (1714), it is determined whether the packet is a Systems Management packet (1718), (e.g., by reference to the higher order bits in the address). If the packet is determined to be a Systems Management packet, the last memory Id (1738) is saved in the Systems Management packet, which is then sent in a posted channel and routed using the memory Id in the packet (1720).

If on the other hand the packet is not a Systems Management packet (1718), it is determined whether the packet is a Write command, either posted or non-posted (1722). If so, it is then determined whether the target memory address of the write packet corresponds to the same memory Id as the previous write packet (1730), i.e., the last used memory Id (1738). If so, the write packet is sent down the appropriate posted or non-posted channel (1732) and routed as a function of the address in the packet. If, however, the target address of the write packet corresponds to a different memory Id (i.e., a memory is addressed), a Flush command is executed. This might occur if a memory boundary is crossed or if status associated with the I/O request is stored in a different memory.

The Flush command pushes all packets in the particular posted channel to the host bridge before allowing any additional packets from the I/O device to be processed. This guarantees that all of the packets in that channel have been stored in the memory before write packets to be written to a different memory are transmitted. This is accomplished by setting a Flush bit to 1 (1734), generating a Flush packet, and saving the last used memory Id in the packet (1736). The Flush is also marked in the pending buffer as having been issued by the Special Processing Engine (1736). The Flush packet is placed in a non-posted channel, and the memory Id in the packet is used for routing (1738). This will cause all write data, posted or non-posted, to get stored in memory. On completion the host bridge will return a response to the sender as described in FIG. 18. In addition the memory Id from the Write packet is saved in the last used memory Id location (1738). The upstream queue is then blocked (1740) with the write command queued as the next packet to be processed.

If, however, the packet is not a write command, it must either be a response packet or a read command packet (1724). If it is determined that it is a read packet, then the request is transmitted via a non-posted channel (1728). If it is not a read packet, then it must be a response. The response packet is transmitted in a response channel (1726). There are two types of response packets. Returned data associated with a previous read command is one type. The other type, called TgtDone, is the response to requests not returning data such as a non-posted write.

Figure 18:
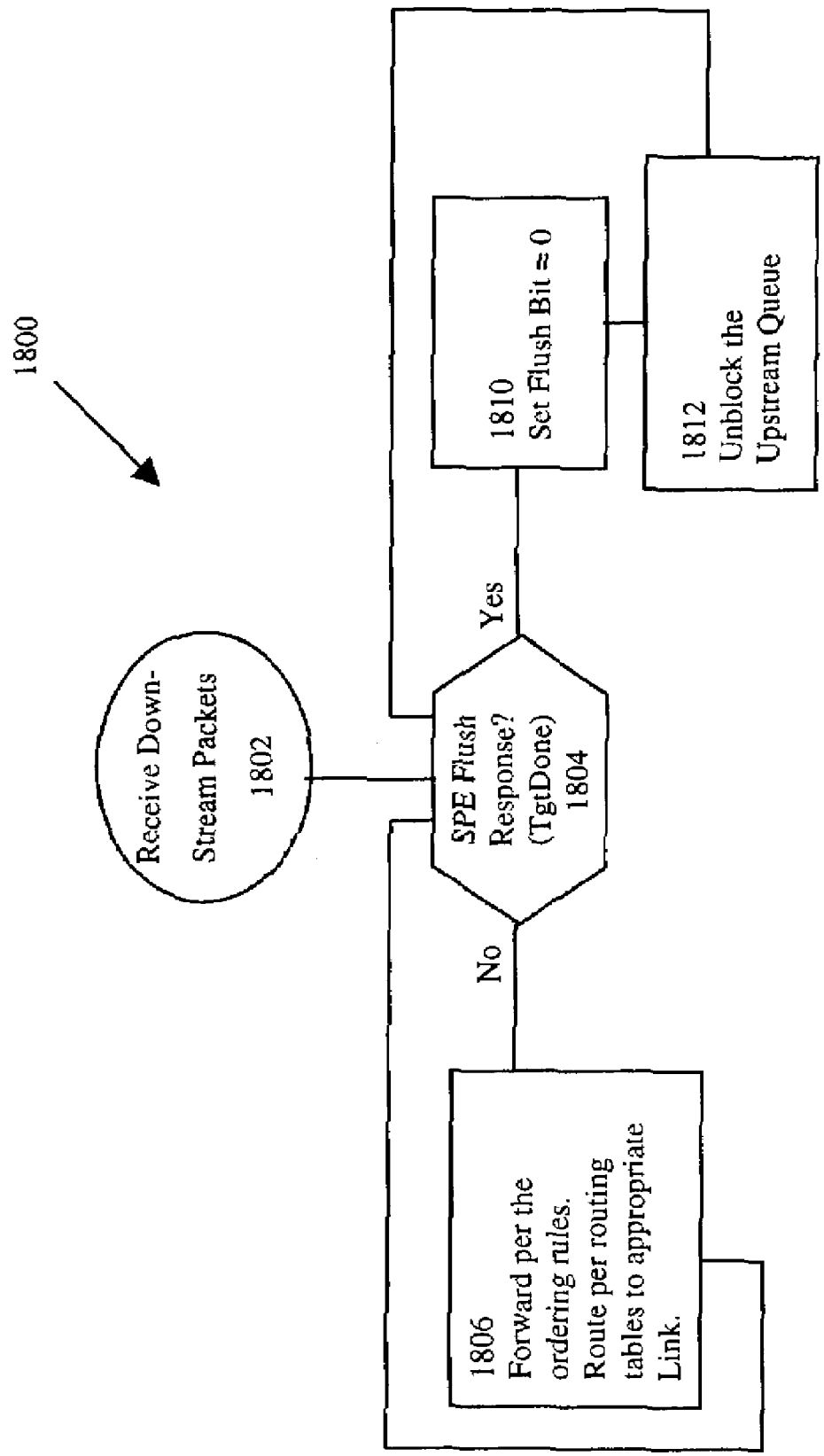
FIG. 18 is a flowchart illustrating the operation of packet ordering logic for downstream packets according to a specific embodiment of the present invention.

Referring to FIG. 18, flowchart 1800 illustrates the operation of logic implemented in the protocol engine(s) to handle down-stream packets, packets sent by the host bridge targeted to the I/O controller of an attached bridge or device (1802). If it is determined that the response is not to an SPE flush (1804), the packet is routed on the appropriate link to its destination (1806). If it is the response to an SPE issued flush command (determined by a flag bit in the pending buffer), then the flush bit is cleared (1810) and the upstream queue is unblocked, allowing upstream requests to be processed (FIG. 17, 1704).

Figure 19:
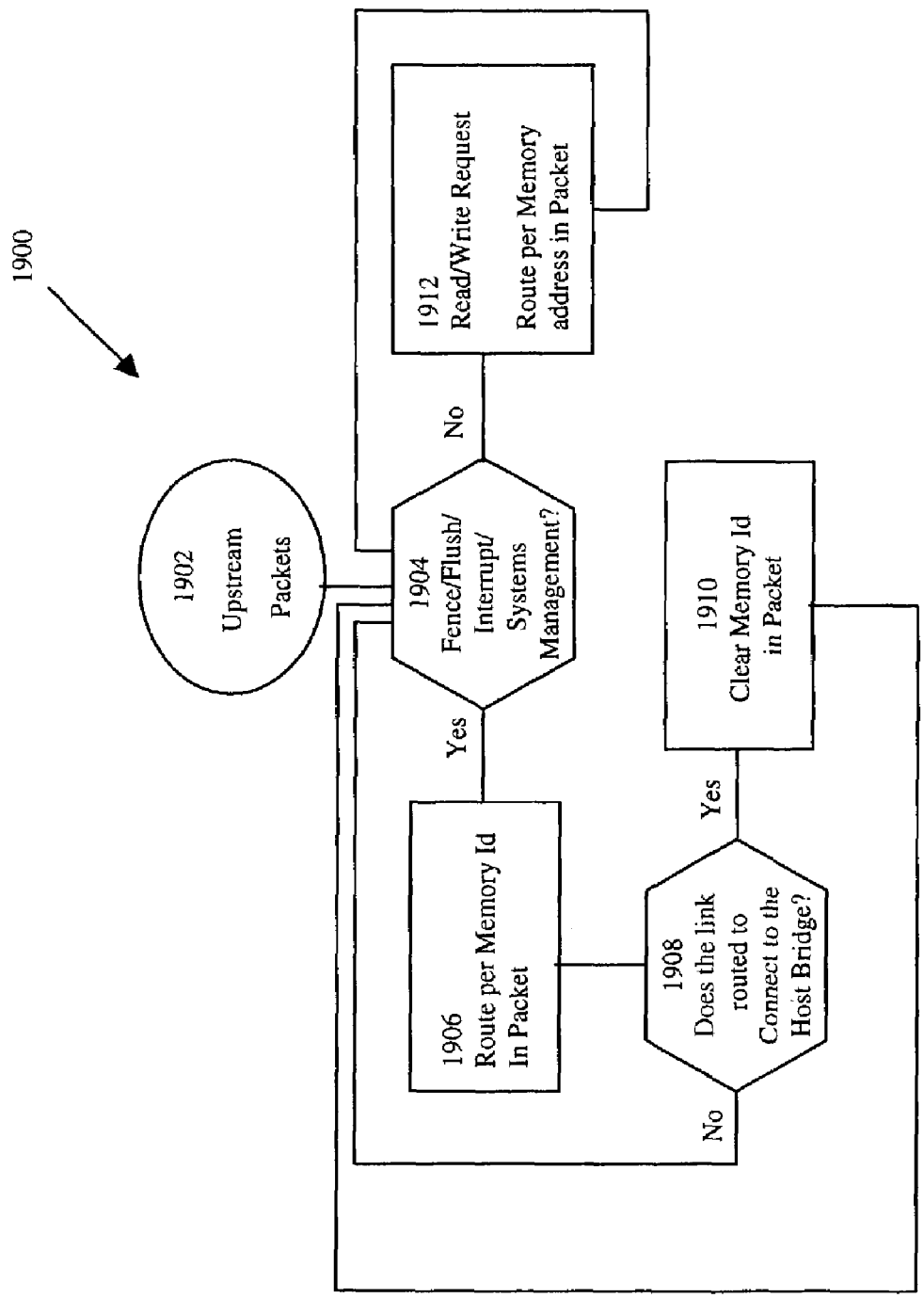
FIG. 19 is a flowchart illustrating the operation of packet ordering logic for certain upstream packets according to a specific embodiment of the invention.

FIG. 19 shows the special routing for upstream requests received on links from a remote I/O controller in a local I/O controller or another remote I/O controller. Examples of these links are shown in FIG. 11, 1150–1164, and FIG. 13, 1310–1316, respectively. This special routing is also used on upstream requests received on links from one local I/O controller in another local I/O controller as shown in FIG. 11, 1134 and 1144, and in FIG. 14 on all links interconnecting local I/O controllers 1402.

Upstream packets are received in 1902. If it is determined that the command is a read or write command (1904) then the packet is routed using the memory address in the packet (1912). If not a read/write request, then it is assumed to be a fence, flush, interrupt, or systems management packet and it is routed based on the memory Id in the packet (1906). If the link on which the packet is to be routed connects to a host bridge (1908), the memory Id is cleared (1910).

The tagging mechanism is used for routing all responses back to the original requester, both upstream and downstream.

While the invention has been particularly shown and described with reference to specific embodiments thereof, it will be understood by those skilled in the art that changes in the form and details of the disclosed embodiments may be made without departing from the spirit or scope of the invention. For example, several embodiments have been described herein as being fully connected, i.e., providing full connectivity between any I/O device and the memory controller any processing node. However, it will be understood that embodiments in which partial connectivity is provided may still be within the scope of the invention. That is, embodiments in which some memory transactions may need to employ parts of the coherent fabric to make connections between a particular I/O device and a particular processing node are contemplated.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer system, comprising a plurality of processing nodes interconnected by a first point-to-point architecture, the processing nodes being configured in a plurality of multiprocessor clusters, the first point-to-point architecture including a plurality of global links and a plurality of local links, the processing nodes within each cluster being interconnected via the local links of the first point-to-point architecture, the clusters being interconnected via the global links of the first point-to-point architecture, the computer system further comprising a system memory comprising a plurality of portions each of which is associated with one of the processing nodes, each processing node comprising a processor, a memory controller for controlling access to the associated portion of the system memory, and a host bridge for facilitating communication with a plurality of I/O devices, the first point-to-point architecture being operable to facilitate first transactions between the processors and the system memory, wherein each cluster further comprises an interconnection controller interconnected with associated ones of the processing nodes in the corresponding cluster via the local links of the first point-to-point architecture, the interconnection controller being configured to facilitate the first transactions, the computer system further comprising at least one I/O controller and a second point-to-point architecture independent of the first point-to-point architecture and interconnecting the I/O controller and the host bridges, wherein each of the at least one I/O controller is coupled to more than one of the host bridges via the second point-to-point architecture and is operable to facilitate second transactions between the I/O devices and the system memory via the second point-to-point architecture, the at least one I/O controller further being operable to conduct communications with the host bridges to which it is coupled via the second point-to-point architecture without using the first point-to-point architecture.

2. The computer system of claim 1 wherein each cluster has a local transaction space associated therewith for uniquely identifying locally generated ones of the first transactions, and wherein the interconnection controller in each cluster is operable to uniquely map selected ones of locally generated first transactions directed to others of the clusters to a global transaction space, and remotely generated ones of the first transactions directed to the associated processing nodes to the local transaction space.

3. The computer system of claim 1 wherein the interconnection controller in each cluster is operable to map locally generated address inflation to others of the clusters, and remotely generated address information to its associated processing nodes.

4. The computer system of claim 1 wherein the interconnection controller in each cluster is operable using global routing information to map locally generated transmissions directed to others of the clusters to the global links of the first point-to-point architecture, and using local routing inflation to map remotely generated transmissions directed to the associated processing nodes to the local links.

5. The computer system of claim 1 wherein the at least one I/O controller comprises a plurality of I/O controllers, each of the clusters having one of the plurality of I/O controllers associated therewith, and wherein the second point-to-point architecture comprises a plurality of global links and a plurality of local links, the processing nodes within each cluster being interconnected with the associated I/O controller via the local links of the second point-to-point architecture the I/O controllers in the clusters being interconnected via the global links of the second point-to-point architecture.

6. The computer system of claim 5 wherein each cluster has a local transaction space associated therewith for uniquely identifying locally generated ones of the second transactions, and wherein to I/O controller in each cluster is operable to uniquely map selected ones of locally generated second transactions directed to others of the clusters to a global transaction space, and remotely generated ones of the second transactions directed to the processing nodes in to associated cluster to the local transaction space.

7. The computer system of claim 5 wherein the I/O controller in each cluster is operable to map locally generated address inflation to others of the clusters, and remotely generated address information to the processing nodes in the associated cluster.

8. The computer system of claim 5 wherein the I/O controller in each cluster is operable using global routing information to map locally generated transmissions directed to others of to clusters to the global links of the second point-to-point architecture and using local routing information to map remotely generated transmissions directed to the processing nodes in the associated cluster to the local links of the second point-to-point architecture.

9. The computer system of claim 5 wherein each cluster has an additional one of the I/O controllers associated therewith, the additional I/O controller being interconnected with the processing nodes and the other I/O controller associated with the cluster via to local links of the second point-to-point architecture.

10. The computer system of claim 9 wherein each of the I/O controllers associated with each cluster is connected to a unique subset of the processing nodes in the associated cluster.

11. The computer system of claim 5 wherein first selected ones of the I/O controllers are connected to second selected ones of the I/O controllers in other clusters via the global links of the second point-to-point architecture.

12. The computer system of claim 5 wherein the I/O controller in each cluster comprises at least one interface operable to connect with selected ones of the I/O devices.

13. The computer system of claim 5 wherein at least one of the I/O controllers is associated with at least one auxiliary I/O interface operable to interface with selected ones of the I/O devices, the at least one I/O controller associated with the auxiliary I/O interface being coupled with selected ones of the I/O controllers associated with the clusters via the global links of the second point-to-point architecture.

14. The computer system of claim 13 wherein the at least one I/O controller associated with the at least one auxiliary I/O interface comprises a plurality of the I/O controllers selected ones of to I/O controllers associated with the at least one auxiliary I/O interface being interconnected wit others of the I/O controllers associated with the at least one auxiliary I/O interface via the global links of the second point-to-point architecture.

15. The computer system of claim 1 wherein the second point-to-point architecture has a transmission protocol associated therewith, the transmission protocol being characterized by transaction ordering rules, the at least one I/O controller being configured to implement logic which ensures proper ordering of the second transactions thereby allowing the I/O devices to facilitate simultaneous communication with more than one of the host bridges via the second point-to-point architecture.

16. The computer system of claim 15 wherein the logic is operable to determine a transaction type for a packet and select a virtual channel type to transmit the packet thereby ensuring ordering of the second transaction in the system memory according to the ordering rules.

17. At least one computer-readable medium having data structures stored therein representative of the I/O controller of claim 8.

18. An I/O controller for use in a computer system having a plurality of processing nodes interconnected by a first point-to-point architecture, the processing nodes being configured in a plurality of multiprocessor clusters, the first point-to-point architecture including a plurality of global links and a plurality of local links, the processing nodes within each cluster being interconnected via the local links of the first point-to-point architecture, the clusters being interconnected via the global links of the first point-to-point architecture, the computer system further comprising a system memory comprising a plurality of portions each of which is associated with one of the processing nodes, each processing node comprising a processor, a memory controller for controlling access to the associated portion of the system memory, and a host bridge for facilitating communication with a plurality of I/O devices, the first point-to-point architecture being operable to facilitate first transactions between the processors and the system memory, wherein each cluster further comprises an interconnection controller interconnected with associated ones of the processing nodes in the corresponding cluster via the local links of the first point-to-point architecture, the interconnection controller being configured to facilitate the first transactions, the computer system farther comprising a second point-to-point architecture independent of the first point-to-point architecture for interconnecting the I/O controller and multiple ones of the host bridges, the I/O controller being operable to facilitate second transactions between the I/O devices and the system memory via the second point-to-point architecture, the I/O controller further being operable to conduct communications with the host bridges to which it is coupled via the second point-to-point architecture without using the first point-to-point architecture.

19. An integrated circuit comprising the I/O controller of claim 18.

20. The integrated circuit of claim 19 wherein the integrated circuit comprises an application-specific integrated circuit.

* * * * *